United States Patent
Bertness et al.

(10) Patent No.: US 10,252,904 B2
(45) Date of Patent: Apr. 9, 2019

(54) SYSTEMS AND METHODS OF CUSTOM CONDIMENT DISPENSING

(71) Applicant: Cornelius, Inc., Osseo, MN (US)

(72) Inventors: Elizabeth Bertness, Batavia, IL (US); Nancy Fortunato, Wauconda, IL (US); Loren Veltrop, Chicago, IL (US)

(73) Assignee: Cornelius, Inc., Osseo, MN (US)

( * ) Notice: Subject to any disclaimer, the term of this patent is extended or adjusted under 35 U.S.C. 154(b) by 0 days.

(21) Appl. No.: 15/353,494

(22) Filed: Nov. 16, 2016

(65) Prior Publication Data
US 2018/0072557 A1 Mar. 15, 2018

Related U.S. Application Data

(60) Provisional application No. 62/393,364, filed on Sep. 12, 2016, provisional application No. 62/415,801, (Continued)

(51) Int. Cl.
*B67D 7/74* (2010.01)
*B67D 7/02* (2010.01)
(Continued)

(52) U.S. Cl.
CPC ............ *B67D 7/743* (2013.01); *B01F 5/0077* (2013.01); *B01F 13/1061* (2013.01);
(Continued)

(58) Field of Classification Search
CPC .... B67D 7/743; B67D 1/0048; B67D 1/0046; B67D 1/0044; B67D 7/10; B67D 7/78;
(Continued)

(56) References Cited

U.S. PATENT DOCUMENTS

| 2,537,119 A | 1/1951 | Buerlein et al. |
| 3,460,717 A | 8/1969 | Thomas |
| | (Continued) | |

FOREIGN PATENT DOCUMENTS

| GB | 2042351 | 9/1980 |
| GB | 2340415 A | 2/2000 |
| | (Continued) | |

OTHER PUBLICATIONS

Extended European Search Report in corresponding EP Application No. 17190320.6, dated Jul. 5, 2018.

*Primary Examiner* — Jason K Niesz
(74) *Attorney, Agent, or Firm* — Andrus Intellectual Property Law, LLP

(57) ABSTRACT

Systems and methods of custom condiment dispensing include a reservoir of base condiment and a plurality of flavoring reservoirs. A first pump is pneumatically connected to the reservoir of base condiment. The second pump is pneumatically connected to at least one flavoring reservoir of the plurality of flavoring reservoirs. A nozzle is fluidly connected to the reservoir of base condiment and fluidly connected to the plurality of flavoring reservoirs. The nozzle is configured to simultaneously dispense the base condiment and at least one flavoring therethrough. A controller receives the user selections of the base condiment and the at least one flavoring and operates the first pump and the second pump to dispense base condiment and at least one flavoring.

19 Claims, 16 Drawing Sheets

Related U.S. Application Data filed on Nov. 1, 2016, provisional application No. 62/403,967, filed on Oct. 4, 2016, provisional application No. 62/393,370, filed on Sep. 12, 2016.

(51) Int. Cl.

| | | |
|---|---|---|
| *B67D 7/10* | (2010.01) | |
| *B67D 7/42* | (2010.01) | |
| *B67D 7/58* | (2010.01) | |
| *B67D 7/78* | (2010.01) | |
| *B67D 7/84* | (2010.01) | |
| *B01F 5/00* | (2006.01) | |
| *B01F 13/10* | (2006.01) | |
| *B67D 1/00* | (2006.01) | |
| *G06Q 30/06* | (2012.01) | |
| *G07F 13/06* | (2006.01) | |
| *A47G 19/18* | (2006.01) | |

(52) U.S. Cl.
CPC ...... *B01F 13/1066* (2013.01); *B01F 13/1069* (2013.01); *B67D 1/0044* (2013.01); *B67D 1/0046* (2013.01); *B67D 1/0048* (2013.01); *B67D 7/02* (2013.01); *B67D 7/10* (2013.01); *B67D 7/423* (2013.01); *B67D 7/58* (2013.01); *B67D 7/78* (2013.01); *B67D 7/84* (2013.01); *G06Q 30/0621* (2013.01); *G07F 13/06* (2013.01); *A47G 19/183* (2013.01)

(58) Field of Classification Search
CPC . B67D 7/84; B67D 7/02; B67D 7/423; B67D 7/58; G07F 13/06; G06Q 30/0621; B01F 13/1066; B01F 13/1061; B01F 13/1069; B01F 5/0077; A47G 19/183
See application file for complete search history.

(56) References Cited

U.S. PATENT DOCUMENTS

| | | |
|---|---|---|
| 3,575,352 A | 4/1971 | Hall et al. |
| 4,218,014 A | 8/1980 | Tracy |
| 4,635,825 A | 1/1987 | Tulasne |
| 4,708,266 A | 11/1987 | Rudick |
| 4,753,370 A | 6/1988 | Rudick |
| 4,792,402 A | 12/1988 | Fricker |
| 4,928,854 A | 5/1990 | McCann et al. |
| 4,967,932 A | 11/1990 | Wiley et al. |
| 5,025,840 A | 6/1991 | Tacke |
| 5,033,651 A | 7/1991 | Whigham et al. |
| 5,102,016 A | 4/1992 | Ball et al. |
| 5,203,474 A | 4/1993 | Haynes |
| 5,308,631 A | 5/1994 | Anglerot |
| 5,366,117 A | 11/1994 | Mesenbring et al. |
| 5,415,326 A | 5/1995 | Durham et al. |
| 5,429,681 A | 7/1995 | Mesenbring |
| 5,435,466 A | 7/1995 | Du |
| 5,549,222 A | 8/1996 | Schroeder |
| 5,566,863 A | 10/1996 | Mesenbring et al. |
| 5,570,822 A | 11/1996 | Lemarbe et al. |
| 5,649,644 A | 7/1997 | Hashimoto et al. |
| 5,799,832 A | 9/1998 | Mayo |
| 6,003,733 A | 12/1999 | Wheeler |
| 6,016,935 A | 1/2000 | Huegerich et al. |
| 6,047,859 A | 4/2000 | Schroeder et al. |
| 6,095,371 A | 8/2000 | Mooney |
| 6,189,736 B1 | 2/2001 | Phallen et al. |
| 6,220,047 B1 | 4/2001 | Vogel et al. |
| 6,227,420 B1 | 5/2001 | Jepson |
| 6,253,963 B1 | 7/2001 | Tachibana |
| 6,328,229 B1 | 12/2001 | Duronio et al. |
| 6,345,729 B1 | 2/2002 | Santy |
| 6,357,632 B1 * | 3/2002 | Salmela ............... B67D 1/0085 222/334 |
| 6,390,662 B1 | 5/2002 | Henry et al. |
| 6,481,645 B1 | 11/2002 | Taylor-McCune et al. |
| 6,689,410 B2 | 2/2004 | Gerber |
| 6,698,229 B2 | 3/2004 | Renken et al. |
| 6,719,175 B2 | 4/2004 | Mackenzie et al. |
| 6,722,530 B1 | 4/2004 | King et al. |
| 6,739,524 B2 | 5/2004 | Taylor-McCune et al. |
| 6,745,592 B1 | 6/2004 | Edrington et al. |
| 6,871,761 B2 | 3/2005 | Fox |
| 7,059,761 B2 | 6/2006 | Gerber |
| 7,159,743 B2 | 1/2007 | Brandt et al. |
| 7,243,818 B2 | 7/2007 | Jones |
| 7,337,920 B2 | 3/2008 | Duck et al. |
| 7,445,133 B2 | 11/2008 | Ludovissie et al. |
| 7,487,887 B2 | 2/2009 | Ziesel |
| 7,559,346 B2 | 7/2009 | Herrick et al. |
| 7,717,297 B2 | 5/2010 | Kadyk et al. |
| 7,757,896 B2 | 7/2010 | Carpenter et al. |
| 7,878,370 B2 | 2/2011 | Sevcik et al. |
| 7,997,448 B1 | 8/2011 | Leyva |
| 8,091,737 B2 | 1/2012 | Smeller et al. |
| 8,113,386 B2 | 2/2012 | Herrick et al. |
| 8,167,173 B1 | 5/2012 | Simmonds et al. |
| 8,245,629 B2 | 8/2012 | Little |
| 8,322,570 B2 | 12/2012 | Beavis et al. |
| 8,490,829 B2 | 7/2013 | Deo et al. |
| 8,511,348 B2 * | 8/2013 | Lillard, Jr. ........... B67D 1/0888 141/2 |
| 8,561,841 B2 | 10/2013 | Erman et al. |
| 8,584,900 B2 | 11/2013 | Metropulos et al. |
| 8,622,257 B2 | 1/2014 | Erman et al. |
| 8,631,974 B2 | 1/2014 | Piatnik et al. |
| 8,798,799 B2 | 8/2014 | Deo et al. |
| 8,839,989 B2 | 9/2014 | Beavis et al. |
| 8,893,927 B2 | 11/2014 | Olson et al. |
| 8,899,280 B2 | 12/2014 | Deo et al. |
| 9,026,245 B2 | 5/2015 | Tilton et al. |
| RE46,143 E | 9/2016 | Erman et al. |
| 9,622,615 B2 | 4/2017 | Hecht et al. |
| 2002/0083730 A1 | 7/2002 | Giroux et al. |
| 2003/0161923 A1 | 8/2003 | Holland et al. |
| 2004/0159676 A1 | 8/2004 | Adema |
| 2005/0051577 A1 | 3/2005 | Loeb et al. |
| 2005/0067433 A1 | 3/2005 | Brandt et al. |
| 2006/0157504 A1 | 7/2006 | Barker et al. |
| 2006/0196886 A1 | 9/2006 | Fox |
| 2008/0041876 A1 | 2/2008 | Frank et al. |
| 2008/0073376 A1 | 3/2008 | Gist et al. |
| 2008/0083780 A1 | 4/2008 | Romanyszyn et al. |
| 2008/0314918 A1 | 12/2008 | Nuriely |
| 2009/0095771 A1 | 4/2009 | Hoover |
| 2009/0120958 A1 | 5/2009 | Landers et al. |
| 2009/0230149 A1 | 9/2009 | Smeller et al. |
| 2010/0145522 A1 | 6/2010 | Claesson et al. |
| 2010/0147875 A1 | 6/2010 | Santos et al. |
| 2011/0264285 A1 | 10/2011 | Mattos et al. |
| 2012/0126034 A1 | 5/2012 | Nolen et al. |
| 2012/0285329 A1 | 11/2012 | Verhoeven et al. |
| 2013/0096715 A1 | 4/2013 | Chung et al. |
| 2013/0177261 A1 | 7/2013 | Bushnaw |
| 2013/0200103 A1 | 8/2013 | Gates |
| 2013/0206793 A1 | 8/2013 | Minica et al. |
| 2013/0282169 A1 | 10/2013 | Moore et al. |
| 2014/0069953 A1 | 3/2014 | Metropulos et al. |
| 2014/0081777 A1 | 3/2014 | Mastrodonato et al. |
| 2014/0114469 A1 | 4/2014 | Givens et al. |
| 2014/0263414 A1 | 9/2014 | San Miguel et al. |
| 2014/0372233 A1 | 12/2014 | Knecht et al. |
| 2015/0017297 A1 | 1/2015 | Vastardis et al. |
| 2016/0068383 A1 | 3/2016 | Falco, III |
| 2016/0229675 A1 | 8/2016 | Popov et al. |
| 2016/0332176 A1 | 11/2016 | Mastro et al. |
| 2017/0119199 A1 | 5/2017 | Williston et al. |
| 2017/0122444 A1 | 5/2017 | Wilson et al. |
| 2017/0122449 A1 | 5/2017 | Wilson et al. |
| 2017/0122450 A1 | 5/2017 | Wilson et al. |
| 2017/0122451 A1 | 5/2017 | Wilson et al. |

(56) References Cited

U.S. PATENT DOCUMENTS

2017/0123509 A1  5/2017 Erman et al.
2017/0190554 A1  7/2017 Dahlberg et al.

FOREIGN PATENT DOCUMENTS

| WO | 9927070 A1 | 6/1999 |
| WO | 2007087611 A1 | 8/2007 |
| WO | 2012135917 A1 | 10/2012 |
| WO | 2014062915 A2 | 4/2014 |
| WO | 2014151946 A1 | 9/2014 |

* cited by examiner

SYSTEMS AND METHODS OF CUSTOM CONDIMENT DISPENSING

CROSS REFERENCE TO RELATED APPLICATION

The present application claims priority of U.S. Provisional Patent Application No. 62/393,364, filed on Sep. 12, 2016, 62/393,370, filed on Sep. 12, 2016, U.S. Provisional Patent Application No. 62/403,967, filed on Oct. 4, 2016, and U.S. Provisional Patent Application No. 62/415,801, filed on Nov. 1, 2016, the contents of which are hereby all incorporated herein by reference in their entireties.

BACKGROUND

As restaurants, concessions, and vending services move towards increased customized product offerings and consumers look for a more personalized food experience, vendors are looking for new ways to incorporate these trends. A dispenser of custom flavored condiments is thus desirable in the field. Mixing of custom condiments presents challenges as two one or more semi-solid food stuffs are designed to be mixed into a homogenous condiment for user consumption.

BRIEF DISCLOSURE

An exemplary embodiment of a custom condiment dispenser includes a reservoir of base condiment. A first pump is pneumatically connected to the reservoir of base condiment. A plurality of flavoring reservoirs are pneumatically connected to at least a second pump. A nozzle is fluidly connected to the reservoir of base condiment and fluidly connected to the plurality of flavoring reservoirs. The nozzle is configured to simultaneously dispense the base condiment and at least one flavoring through the nozzle. A user interface is operable to receive user selections of a base condiment and at least one flavoring. A controller is operatively connected to the user interface, the first pump, and the second pump. The controller receives the user selections of the base condiment and at least one flavoring and operates the first pump and the second pump to dispense base condiment and at least one flavoring of the user selection through the nozzle.

An exemplary embodiment of a method of dispensing condiment includes presenting at least one base condiment and a plurality of flavorings on a user interface of a condiment dispenser. A selection of a base condiment is received through the user interface. A selection of at least one flavoring from the plurality of flavorings is received through the user interface. A first pump pneumatically connected to a reservoir of the base condiment is operated to provide the base condiment to a nozzle. At least a second pump pneumatically connected to at least one reservoir of the selected at least one flavoring is operated to provide the selected at least one flavoring to the nozzle. The base condiment and the at least one flavoring are mixed inside the nozzle. The base condiment and the selected at least one flavoring are simultaneously dispensed from the nozzle.

DETAILED DISCLOSURE

Figure 1:
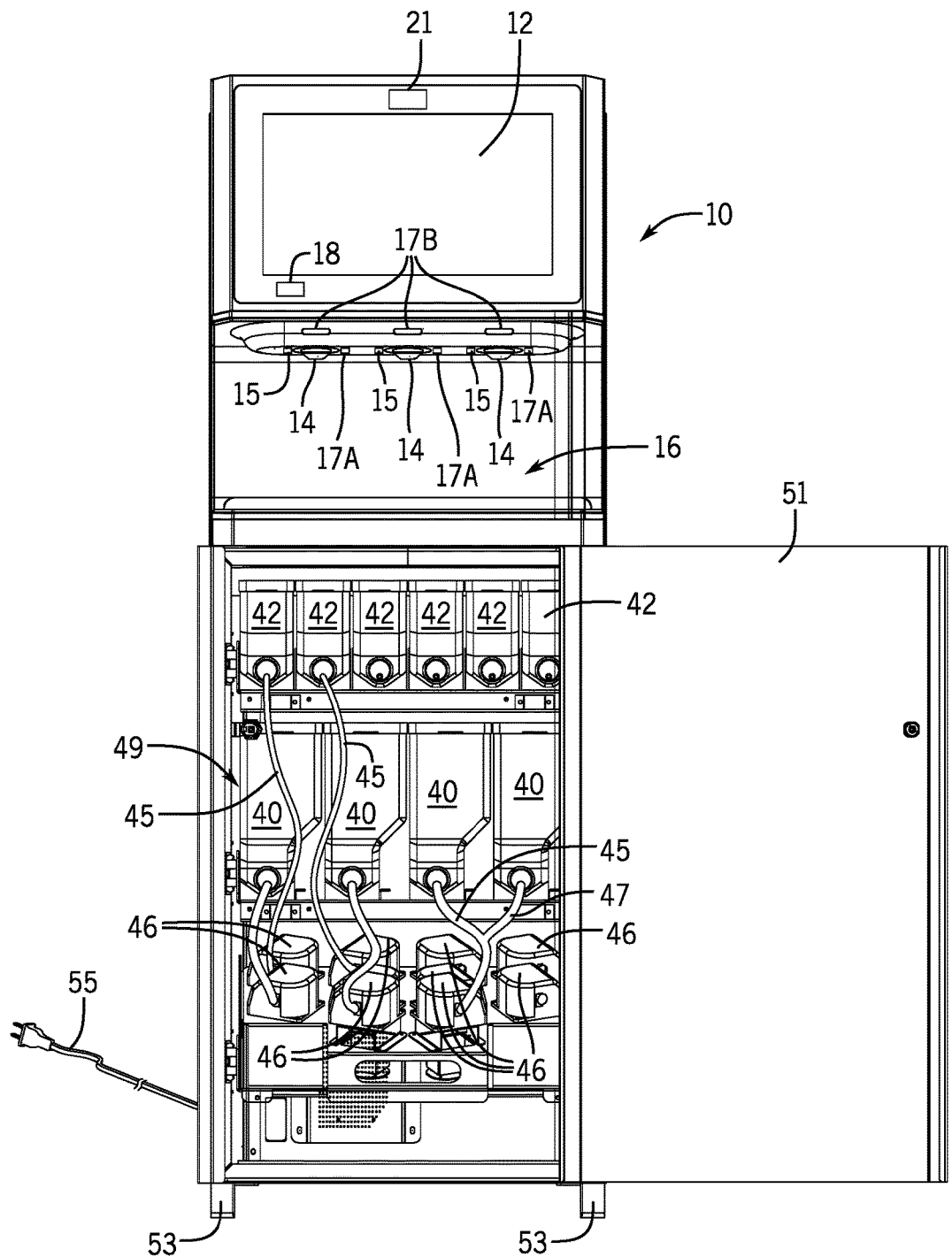
FIG. 1 depicts an exemplary embodiment of a custom condiment dispenser.
Figure 2:
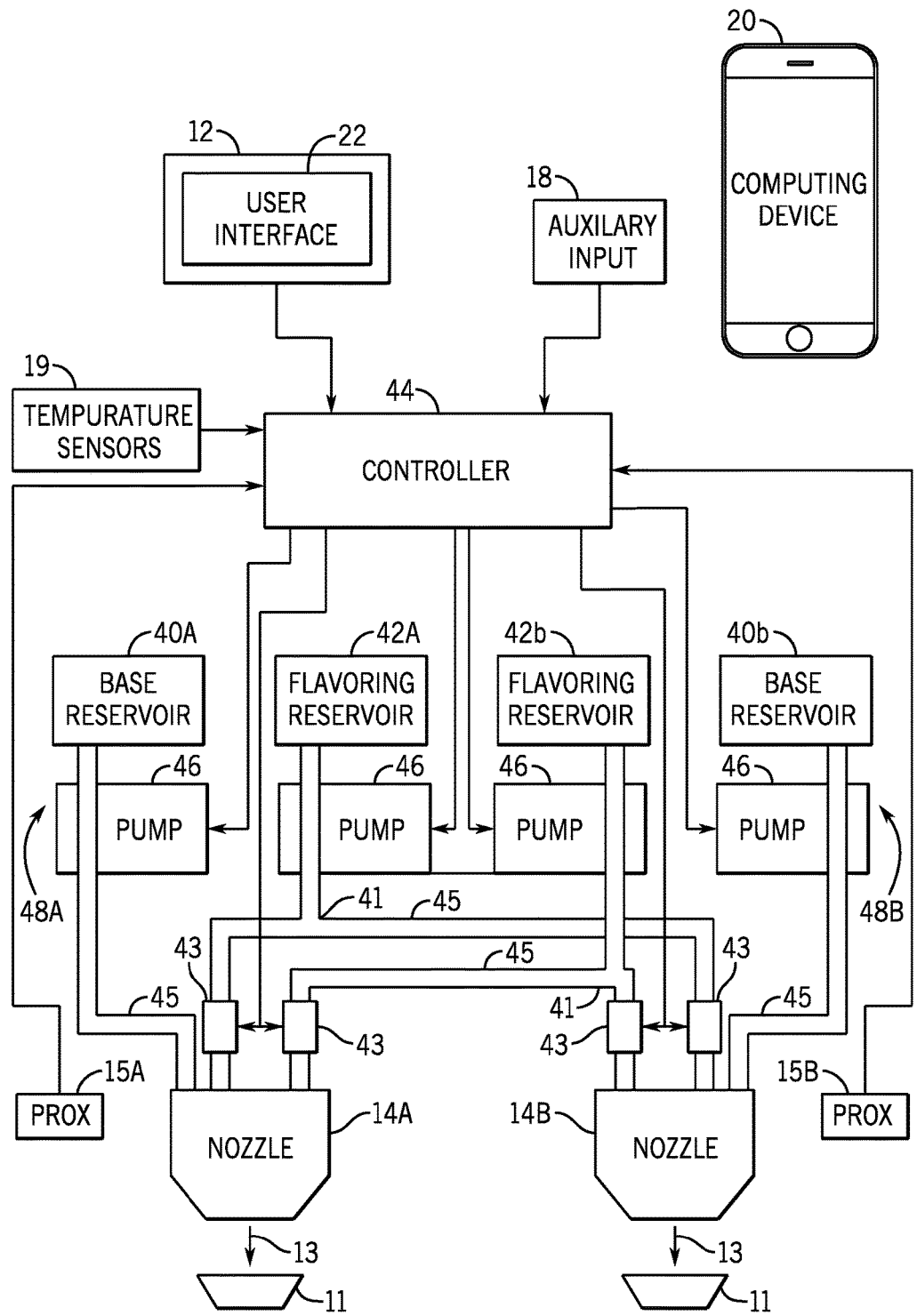
FIG. 2 is a system diagram that depicts an exemplary embodiment of the custom condiment dispenser.
Figure 3:
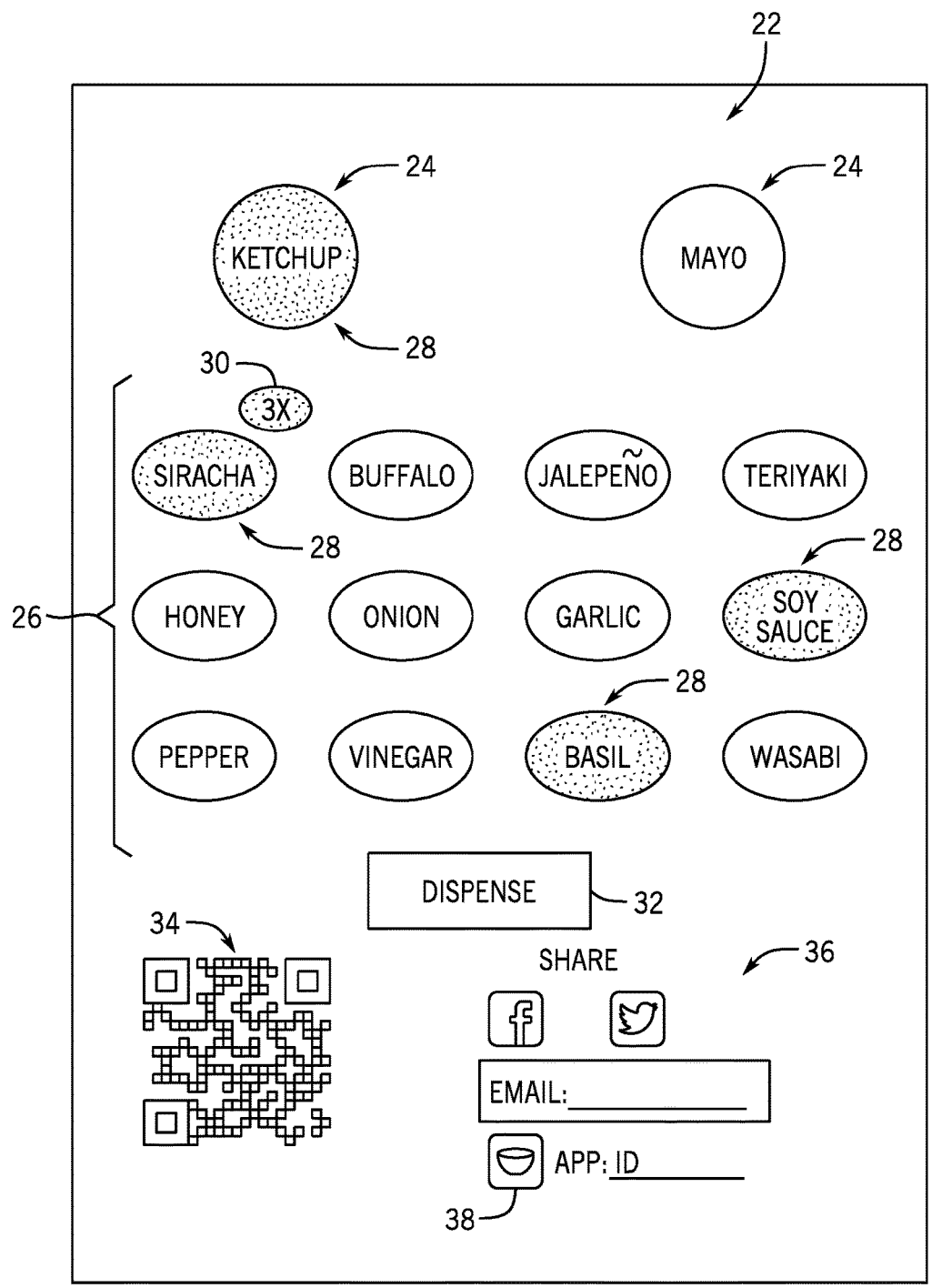
FIG. 3 is an exemplary embodiment of a user interface for a custom condiment dispenser.

FIG. 1 depicts an exemplary embodiment of a custom condiment dispenser 10. FIG. 2 is a system diagram of an exemplary embodiment of the custom condiment dispenser 10. The custom condiment dispenser 10 exemplarily includes a graphical display 12, which may also function as a user input device in exemplary embodiments of which will be described in further detail herein. FIG. 3 depicts an exemplary embodiment of a user interface 22 as may be presented on the graphical display 12. The graphical display 12 is exemplarily a touch screen graphical display that is operable as a user interface, although it will be recognized that in other embodiments, other forms of user interfaces including but not limited to physical keyboards, gesture, as well as wireless embodiments including WI-FI and/or BLUETOOTH protocols for communication with a smart phone or other handheld wireless device may be used.

The custom condiment dispenser 10 further includes at least one nozzle 14 through which the custom condiment is dispensed into a dispensing area 16 in which the user may place a receptacle 11 such as a portion cup, a food item, or a refillable bottle. The custom condiment dispenser 10 operates to dispense a portion 13 of a requested created custom condiment into the receptacle. Embodiments of the custom condiment dispenser 10 may further include a proximity sensor 15 and/or a light 17 associated with each nozzle 14. In an exemplary embodiment, the proximity sensors 15 produce signals indicative of when something (e.g. a receptacle or a food item) is positioned below the nozzle 14. This signal may be used by the condiment dispenser 10 to turn on the associated light 17, illuminating the receptacle and or food item receiving the custom condiment. In another example, the signal from the proximity sensor may be used in the control of dispensing of the condiment to prevent dispense of the condiment when no receptacle or food item is sensed below the nozzle 14.

It will be recognized that embodiments of the custom condiment dispenser 10 may operate in a variety of ways to dispense various types of custom condiments while remaining within the scope of the present disclosure. In an exemplary embodiment, the custom condiment dispenser 10 may include base condiment reservoirs 40, for example, but not limited to reservoirs 40 for ketchup, barbecue sauce, and/or ranch dressing. The custom condiment dispenser 10 includes flavoring reservoirs 42. As will be described in further detail herein, the flavorings contained within the flavoring reservoirs 42 and used by the condiment dispenser 10 may take a variety of forms including, but not limited to liquid concentrated flavoring, granular flavoring, or a concentrated flavoring sauce. It is understood that the flavoring reservoirs 42 may be adapted to contain and dispense a particular type of flavoring. Upon user operation of the user interface presented on the graphical display 12 to select a custom condiment to dispense, a controller 44 operates the custom condiment dispenser 10 to dispense the combination of the base condiment and at least one of the appropriately selected flavorings to produce the selected custom condiment. In other embodiments, the custom condiment dispenser may include receptacles (not depicted) containing a variety of premixed condiment flavor from which a user may select as described herein. Upon selection by user, the custom condiment dispenser 10 operates to dispense a portion of the selected condiment from the appropriate receptacle(s) through one or more nozzles 14.

As exemplarily depicted in FIGS. 1 and 2 the condiment dispenser 10 may include one or more base condiment reservoirs 40 and one or more flavoring reservoirs 42. Each of the reservoirs 40, 42 are exemplarily connected to pumps 46 which respectively selectively pump the base condiments and flavorings to the nozzle 14. In an exemplary embodiment a flexible tube 45 may connect each of the reservoirs 40, 42 to at least one of the pumps 46. In exemplary embodiments, the pumps 46 are peristaltic pumps that operate to push the base condiment and or flavoring through the respective tubes. The flexible tubes 45 exemplarily extend through the pumps 46 and prevent the pumps 46 from being in contact with the food flowing through the flexible tubes 45, e.g. the base condiment or flavoring.

In an embodiment, one pump 46 may be associated with each reservoir 40, 42 and in the case of the flavorings, a valve, a series of valves, or a manifold may be positioned after the pump 46 to direct the flavoring to the nozzle of the selected dispensing system. In an exemplary embodiment, each base condiment is arranged in a dispensing system associated with a single nozzle 14. The flexible tube 45 carrying flavoring are directed to each of the nozzles. The flexible tubes 45 carrying flavoring may include a T-connection 41, which may be another type of connection exemplarily depending upon the number of nozzle 14 in the dispenser 10. Valves 43 are disposed in or along each of the flexible tubes 45 carrying flavoring prior to the nozzle. The valves 43 may exemplarily be pinch valves. The valves 43 may be exemplarily communicatively connected to the controller 44, and thus operated by the controller 44 as described herein to control the dispense of the flavorings in conjunction with the dispense of the base condiments.

Thus, as depicted in FIG. 2, a first dispensing system 48A includes condiment reservoir 40A and nozzle 14A, while a second dispensing system 48B includes condiment reservoir 40B and nozzle 14B. In a nonlimiting embodiment, condiment reservoir 40A is filled with ketchup and condiment reservoir 40B is filled with ranch dressing. In other exemplary and non-limiting embodiments, barbeque sauce or mayonnaise may be the base condiments. Flavoring reservoirs 42A and 42B are exemplarily filled with flavorings of different flavors and are both connected to both of the first dispensing system 48A and the second dispensing system 48B. While the system 10 depicted in FIG. 2 uses T-connections 41 and valves 43, it will be recognized that in another embodiment, the flavoring reservoirs 42A, 42B may further be connected to a manifold to direct the flavoring to the nozzles 14A, 14B of the appropriate dispensing system 48A, 48B.

It will be noted that in FIG. 1, two base condiment reservoirs 40 may be connected, exemplarily with a Y-connector 47, for example to provide additional reservoir capacity for a specific type of base condiment. In an exemplary embodiment, if ketchup condiment is used in a greater amount, then two or more reservoirs of ketchup may be simultaneously connected to the ketchup dispensing system. In a still further embodiment, the entire condiment dispenser may be configured to only dispense custom ketchups and all of the base condiment reservoirs 40 are connected together with flexible tubing directed through a single pump. While FIGS. 1 and 2 depict the base condiment and/or flavoring dispensed by electromechanical pumps, it will be recognized that other embodiments may use gravity feed, pressurization within the containers or other dispensing techniques. In still further embodiments, the base condiment and flavoring may mix in a manifold, mix in the nozzle, or dispense into a container separately for later mixing.

While the reservoirs depicted in FIG. 1 are depicted as refillable and reusable containers, it will be recognized that other embodiments may use any of a wide variety of reservoirs. Alternative examples of reservoirs may include, but are not limited to, disposable packaging such as bags, boxes, and bag-in-box packaging. Still further examples of reservoirs may include movable or removable lids to facilitate refilling of reservoirs with additional base condiment or flavoring. In still further examples, the reservoirs may be fillable through an opening with a removable cap, for example a removable cap which facilitates connection of the reservoir to the condiment dispenser. The connections between the reservoirs 40, 42 and the flexible tubes 45 may comprise a two-part connector with ends secured to the flexible tubes 45 designed to mate with a cap or cover of a reservoir to provide a secure connection. In a still further embodiment, particular flexible tubes 45 and reservoirs 42 may be keyed such that the flexible tubes 45 are reconnected only to an associated reservoir such as to avoid cross-contamination of the flavorings, or to ensure that each flavoring line in the custom condiment dispenser carries the expected flavoring.

In the present disclosure, the examples of base condiments of ketchup and mayonnaise will be used for exemplary purposes, although it will be recognized by a person of ordinary skill in the art that other condiments, including, but not limited to mustard, melted or liquid butter, olive oil, melted or liquid cheese sauce, yogurt, ranch, guacamole, sour cream, chili, and/or tartar sauce may be used. In addition to the above savory foods, sweet foods for example sauces, syrups, and other toppings for example chocolate, butterscotch, caramel, and strawberry may be dispensed in other embodiments.

In non-limiting examples, flavors such as sriracha, buffalo, jalapeno, teriyaki, honey, onion, garlic, bacon, oak, soy sauce, smoke, pepper, vinegar, pickle, chili, mint, basil, and/or wasabi may be used although it will be recognized that these examples of flavorings are again merely exemplary of possible flavors and are not intended to be limiting on the scope of flavors that may be provided in a custom condiment dispenser in either of liquid, granular or flavored sauce form. While guacamole and tarter were exemplarily identified above as examples of base condiments, it may also be recognized that those sauces may exemplarily be produced as custom condiments when other base sauces are used in combination with further examples of flavorings. For example in the case of guacamole, a base condiment of sour cream may be combined with avocado and onion and/or jalapeno to produce guacamole. While tarter sauce may be produced by a combination of a base condiment of mayonnaise with onion and pickle relish flavorings.

As previously noted, the flavorings may come in a variety of forms. In one exemplary embodiment, the flavorings are a concentrated liquid flavoring. Such concentrated liquid flavorings may be exemplarily water, alcohol, or oil based and potentially highly concentrated and therefor may require volumetrically a small amount of the flavoring to achieve the custom condiment. In such embodiments, the flavoring reservoirs and associated pumps may be comparatively small to handle these volumes. In another embodiment, the flavoring may be in the form of a flavored sauce. Exemplarily, the flavored sauce may be a liquid starch sauce that carries the flavoring. This increases the volume of the flavoring which can promote mixing of the custom condiments in embodiments as disclosed in further detail herein. In further exemplary embodiments, the carrier sauce may be mixed with varying concentrations of the flavoring to produce different intensities of flavor for custom condiments further as described herein.

In still further exemplary embodiments, the flavoring may be granular or powdered in form and in exemplary embodiments may use a gravity fed system as opposed to the disclosed pumping system as described for use with liquid and/or flavored sauce embodiment.

As described in further detail herein, the custom condiment dispenser 10 further includes an auxiliary input device 18 which may exemplarily be a bar code reader, or more specifically a two dimensional bar code reader, for example a QR code reader, although in other embodiments, may be an infrared, wireless, or wired communication connection. In either event, the auxiliary input device 18 facilitates a communicative connection with a computing device 20, for example, a smartphone. In embodiments, the computing device 20 may be used in whole or in part by the user to input the selected custom condiment rather than, or in addition to, interaction with the user interface 12. It will be recognized that in other embodiments, particularly embodiments where the custom condiment dispenser 10 is configured for use by a food service or food preparation worker, the computing device 20 may be a computer, tablet computer, or other device communicatively connected at the auxiliary input device 18 providing instructions to the custom condiment dispenser 10. In still further embodiments, QR codes or other bar codes as read by the auxiliary input device 18 can be used to carry out other functions of the custom condiment dispenser 10. This can include set-up, maintenance, cleaning, or service functions. These exemplary QR codes may be stored or generated on a mobile computing device of a service technician or person tasked with cleaning the device. In other embodiments, one or more QR codes may be provided in a maintenance manual for the custom condiment dispenser.

The custom condiment dispenser 10, further exemplarily includes a proximity sensor 21 located at a front of the device, exemplarily near the graphical display 12. Signals from the proximity sensor 21 may exemplarily be used to switch a mode of operation of the custom condiment dispenser 10 for example from a resting mode to a dispensing mode. In a resting mode, the graphical display 12 may be operated to exemplarily present advertisements, pictures, video, or text. In a dispensing mode, the graphical display 12 may be operated as disclosed in further detail herein to present a user interface for the operation and control of the custom condiment dispenser 10.

Exemplary embodiment of the custom condiment dispenser 10 may further include one or more temperature sensors 19 communicatively connected to the controller 44. Temperature sensors 19 may exemplarily be located in or adjacent base condiment reservoirs 40 or flavoring reservoirs 42. In embodiments, as depicted in FIG. 1, the reservoirs 40, 42 may be located in a cabinet 49 closed off by a door 51. The climate e.g. temperature within the cabinet 49 may be controlled by heating and/or refrigeration devices (not depicted) such as to control the temperature of the base condiments and/or flavorings within the reservoirs. In exemplary embodiments, the heating and/or refrigeration devices may heat or cool the cabinet 49 of the condiment dispenser 10 to a specified temperature or within a specified temperature range. In another exemplary embodiment, heating and/or cooling devices may be incorporated into the reservoirs 40, 42 or be component(s) of the cabinet 49 that engage the reservoirs 40,42. Heating and/or cooling devices may exemplarily include, but are not limited to electrical resistive heaters, refrigeration lines, heat sinks, Pelletier devices, circulation of heated or cooled fluids, and/or forced air heating or cooling systems, although a person of ordinary skill in the art will recognize other suitable heating or cooling devices. One or more temperature sensors 49 located within the cabinet 51 may used in a feedback control to operate the heaters and/or refrigeration devices to control this temperature.

In still further embodiments, the temperature of the custom condiment may be controlled, exemplarily with a heating or cooling manifold (not depicted) in association with the nozzle 14 or in the nozzle 14 itself for heating or cooling the base condiment and/or flavorings prior to mixing and dispense. A temperature sensor 19 associated with the heating or cooling manifold may further be connected to the controller 44 to carry out operation of this heating or refrigeration device.

As further depicted in FIG. 1, embodiments of the custom condiment dispenser 10 may be situated on castors 53 to facilitate movement of the custom condiment dispenser 10. Exemplarily, castors 53 may facilitate installation or positioning of the condiment dispenser 10 or movement of the custom condiment dispenser 10 to another location for service and/or cleaning.

Embodiments of the custom condiment dispenser 10 may further include a power cord 55 configured to connect to the local power grid of a facility exemplarily provided with utility electricity.

FIG. 3 depicts an exemplary embodiment of a graphical user interface (GUI) 22 as may be visually presented on the user interface 12 of the custom condiment dispenser 10. The GUI 22 exemplarily includes a plurality of buttons as described herein which may be selected by a user, for example by physically touching the buttons in the case of a touch sensitive user interface. The GUI 22 includes base condiment buttons 24 for the selection of a base condiment and a plurality of flavoring buttons 26 for the selection of one or more additional flavorings. The user selects a base condiment button 24 to select a base condiment and then at least one, if not more flavoring buttons 26 to add additional flavoring to the selected base condiment. In an exemplary embodiment, once the user selects one of the base condiment buttons 24, that button becomes a highlighted button 28 to indicate that the user has selected that base condiment. Similarly, as the user selects flavoring buttons 26 those buttons also become highlighted buttons 28 to provide a similar indication. It will be recognized that the highlighted buttons 28 may exemplarily be a visual indication such as darkening or lightening, or brightening the button selection or providing another very perceptible change to the button to indicate selection as will be recognized by a person of ordinary skill in the art. In additional embodiments, if a user selects a flavoring button 26 more than once, an indicator 30 will appear to denote the number of "portions" of the selected flavor to be added in making the custom condiment. In exemplary embodiments, the intensity of the flavoring in the custom condiment may be achieved in various ways depending upon the form of the flavoring. For example, if the flavoring is a concentrated liquid, the intensity may be controlled by increasing the volume of the concentrated flavoring. If the flavoring is a flavored carrier sauce, reservoirs may be provided with carrier sauces mixed with different concentrations of the concentrated flavoring. In a non-limiting embodiment, three levels of intensity carrier sauces may be provided a low intensity with 6% concentrated flavoring, a medium intensity with 12% concentrated flavoring, and a high intensity with 18% concentrated flavoring. In a still further exemplary embodiment, a reservoir of the carrier sauce may be mixed with varying amounts of the concentrated flavorings to produce a requested intensity of the flavoring. Such an embodiment may be beneficial by reducing the required inventory of flavorings (by eliminating separate intensity) while still providing advantages in mixing of the custom condiment provided by the use of the carrier sauce. After the user has selected the custom condiment, the user selects the dispense button 32. Upon receiving an input of selection of the dispense button 32, the custom condiment dispenser operates in the manner described above to produce the selected custom condiment.

As will be described in further detail herein, the GUI 22 also operates to produce a recipe identification ("recipe ID") 34, which is exemplarily depicted in FIG. 3 as a QR code. In exemplary embodiments, the recipe ID 34 may exemplarily be any of a variety of identifiers, including, but not limited to barcodes or other two dimensional barcodes, as well as numerical or alpha-numerical identifiers capable of functioning in the manners as described herein. The recipe ID 34 embodies the custom condiment as selected by the user, including the base condiment, and one or more flavorings. The recipe ID may be used in embodiments as described in further detail herein.

The GUI 22 further includes a share section 36 which provides the user with the option to share the custom condiment, and particularly the recipe ID 34 through social media or other communication channels. As non-limiting examples, the user may share or send the recipe ID through Facebook, Twitter, to an e-mail address, or to a coordinated app on a mobile computing device, exemplarily a smart phone. In one such embodiment, the user may enter an app ID number or user name and selection of the app button 38 to forward the recipe ID to the user entered account for access using the mobile computing device. User interaction with the GUI 22, exemplarily depicted in FIG. 3 inputs commands to the controller 44 as exemplarily depicted in FIG. 2. In an embodiment, upon user selection of the dispense button 32, the custom condiment dispenser 10 operates to dispense the selected custom condiment in the manners as presently disclosed. In embodiments, the timing and control of the dispense can be carried out in a number of ways while remaining within the present disclosure. Upon a selection of the dispense button 32, the dispenser may dispense a predetermined volume or a user selected volume. A single interaction with the dispense button may initiate dispense of the entire defined volume. In another embodiment, the dispenser may dispense as long as the user continues to touch or otherwise engage the dispense button 32. This embodiment may be limited by a maximum dispense amount. In an example, the dispenser will dispense up to a predetermined full dispense volume which may exemplarily be a portion e.g 1 oz, 1.5 oz, 2 oz, or 6 oz, although these are not intended to be limiting on the volume of such a maximum dispense amount. Embodiments such as this allow the user to control the precise volume dispensed by stopping dispense at the user's discretion, while also limiting excessive dispense and waste of condiment.

In still further embodiments in which a proximity sensor 15A, 15B is associated with one of the nozzles 14A, 14B, the controller 44 further receives signals from the proximity sensors 15A, 15B and controls the dispense of the custom condiment based upon a combination of a sensed object in proximity to the respective nozzle and the user selection of the dispense button 32. In one example, the controller 44 must be receiving the input of the pressed dispense button 32 and a signal indicating that something is below the nozzle 14 through which the condiment will be dispensed, before the controller 44 will send the control signals to operate the dispenser to dispense the requested custom condiment. In another embodiment the controller may operate to only initiate dispensing after the input of the dispense button 32 has been received and proximity of an object near the nozzle is confirmed. In a related embodiment, the controller may further stop or end dispensing if the signal from the proximity sensor indicates that there is no longer an object in proximity to the nozzle. These embodiments can further help to reduce wasted condiment and keep the dispensing area 16 clean. Additionally, in an embodiment where the condiment dispenser provides multiple nozzles, and each nozzle dispenses a different base condiment, the associated proximity sensor and controls as disclosed can help to ensure that the user has positioned the receptacle below the correct nozzle to receive the dispensed condiment.

In an embodiment of the custom condiment dispenser 10 that dispenses custom condiments of multiple base condiments, the custom condiment dispenser 10 may use one nozzle 14 and dispensing system 48 for each of the base condiments. In such an embodiment, the GUI may operate to move the dispense button 32 or provide the dispense button 32 that is oriented relative to the nozzle from which the custom condiment will be dispensed (not depicted). Exemplarily, the dispense button 32 is aligned above the nozzle from which the custom condiment will be dispensed. In one embodiment, a single dispense button is moved in the GUI 22 to a position associated with the nozzle from which the custom condiment will be dispensed. In another embodiment, multiple dispense buttons are provided which are aligned with respective nozzles with which the dispense button is associated. In an embodiment, the dispense button associated with the nozzle from which the custom condiment will be dispensed is highlighted, illuminated, bolded or otherwise made visually compelling while the other dispense buttons may be shaded, lightened, or otherwise hidden to direct the user to the nozzle from which the custom condiment will be dispensed.

As previously mentioned, embodiments of the custom condiment dispenser 10 may include one or more lights 17A, 17B associated with each of the nozzles 14. In embodiments, lights 17A, 17B may be illuminated to direct the user's attention to the nozzle 14 from which the custom condiment will be dispensed. In an exemplary embodiment, light 17A may be directed into the dispensing area 16 to illuminate the dispensing area 16 below the nozzle 14 from which the custom condiment will be dispensed. In another exemplary embodiment light 17B is located in the front of the dispenser 10, e.g. directed towards the view of the user such that upon illumination, the user's attention is drawn to the nozzle 14 from which the custom condiment will be dispensed.

In an exemplary embodiment, a user interacts with the custom condiment dispenser 10 through the GUI 16. The user inputs selections of a base condiment and at least one flavoring for a requested custom condiment. The user input selections may further include an intensity or amount of a flavoring to be added. After the user has input selections for the custom condiment, the user selects a dispense button to request dispense of the selected custom condiment. The condiment dispenser operates to provide the base condiment and at least one flavoring to the nozzle 14 for mixing and dispense of the requested custom condiment.

FIGS. 4-9 depict exemplary embodiments of nozzles which may be used in exemplary embodiments of a custom condiment dispenser 10. In general, each of the nozzles receives a flow of a base condiment and a flow of at least one flavoring out of a plurality of potential flows of flavorings. In exemplary embodiments the base condiment and the at least one flavoring can mix in the nozzle, as the base condiment and at least one flavoring exists the nozzle, and/or after the base condiment and at least one flavoring is received within a receptacle. It will be recognized that as used herein "mixing" need not result in a homogenous mixture between the base condiment and the at least one flavoring and that a customer condiment may be "mixed" without being uniform in distribution of consistent component or uniform in color.

Current solutions for mixing rely upon dissolving flavoring in a base substance, turbulent mixing for example by vibration, agitation, or turbulent flow. Other solutions simply collect constituent components in a single location for later mixing, for example by the user. In exemplary embodiments as disclosed in further detail herein, nozzles are contemplated that use laminar mixing at low flow rates. It will be recognized that the internal geometry of the nozzles may be further designed to further promote such mixing within the nozzle.

One challenge to laminar mixing of foods is that while increased surface area of the interface between the base condiment and the flavorings enhances the shear mixing effect during the laminar flow, increased physical surfaces in the nozzle and increased complexity of the nozzle geometry can create spaces which are challenging to clean and keep clean making such geometries impractical for use in food processing. Still further challenges addressed by the nozzle 14 are that shear mixing occurs upon interaction of the substances in a laminar flow however, currently available geometries for nozzles to create such laminar flow do so at a high pressure drop. This high pressure drop and the resulting increase velocity causes shear thinning among many base condiments which are often fluid or semisolid foods which rheologically act as pseudo plastics or non-Newtonian fluids. Shear thinning while increasing mixing can degrade the consumer perceived quality of condiments and mouth feel of condiments. Therefore, geometries of nozzles may be used to exhibit a low pressure drop to maintain condiment quality. Additionally, due to the viscosity of the condiments, the practically achieved flow rates of the condiments may be low due to the qualities available pumps.

Figure 4:
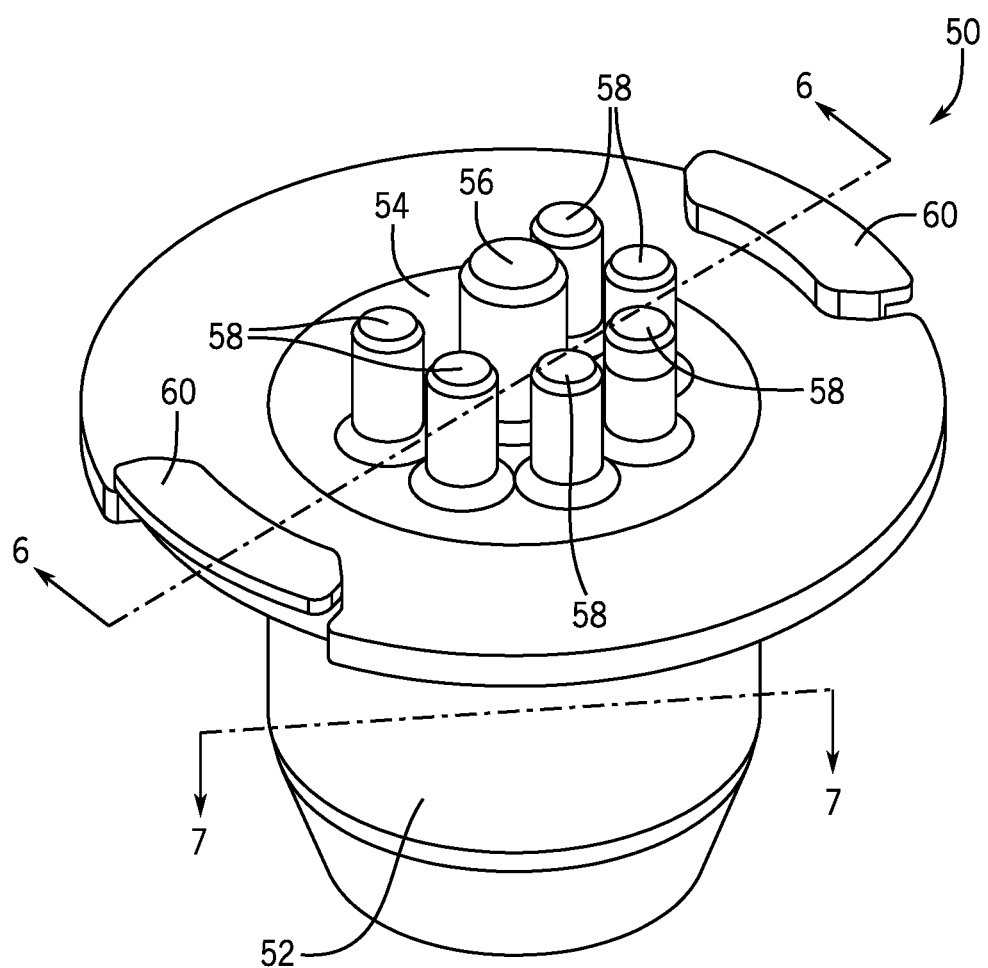
FIG. 4 depicts an exemplary embodiment of a nozzle.

FIG. 4 depicts an exemplary embodiment of a nozzle 50 as may be used to mix custom condiments. The nozzle 50 includes a nozzle sleeve 52 which receives a nozzle insert 54 therein. The nozzle 50 includes a base inlet 56 and a plurality of flavoring inlets 58. In the exemplary embodiment depicted in FIG. 4, the base inlet 56 and the flavoring inlets 58 are located in the nozzle insert 54, although as will be described in further detail herein, in other embodiments either or both of these inlets may extend through the nozzle sleeve. In an exemplary embodiment, the base inlet 56 and the flavoring inlets 58 exemplarily include barb connectors, although it will be recognized that other forms of connectors may be used in other embodiments and that the exemplary connectors as shown in FIG. 4 are configured to be secured to flexible tubes through which the base or flavoring is provided to the nozzle 50.

The nozzle 50 further includes a pair of tabs 60 which exemplarily are used to connect in a bayonet fashion with the dispensing apparatus. In an exemplary embodiment, such connection facilitates ease of removal and reconnection of the nozzle 50 in order to facilitate cleaning of the nozzle and/or replacement of the nozzle.

Figure 5:
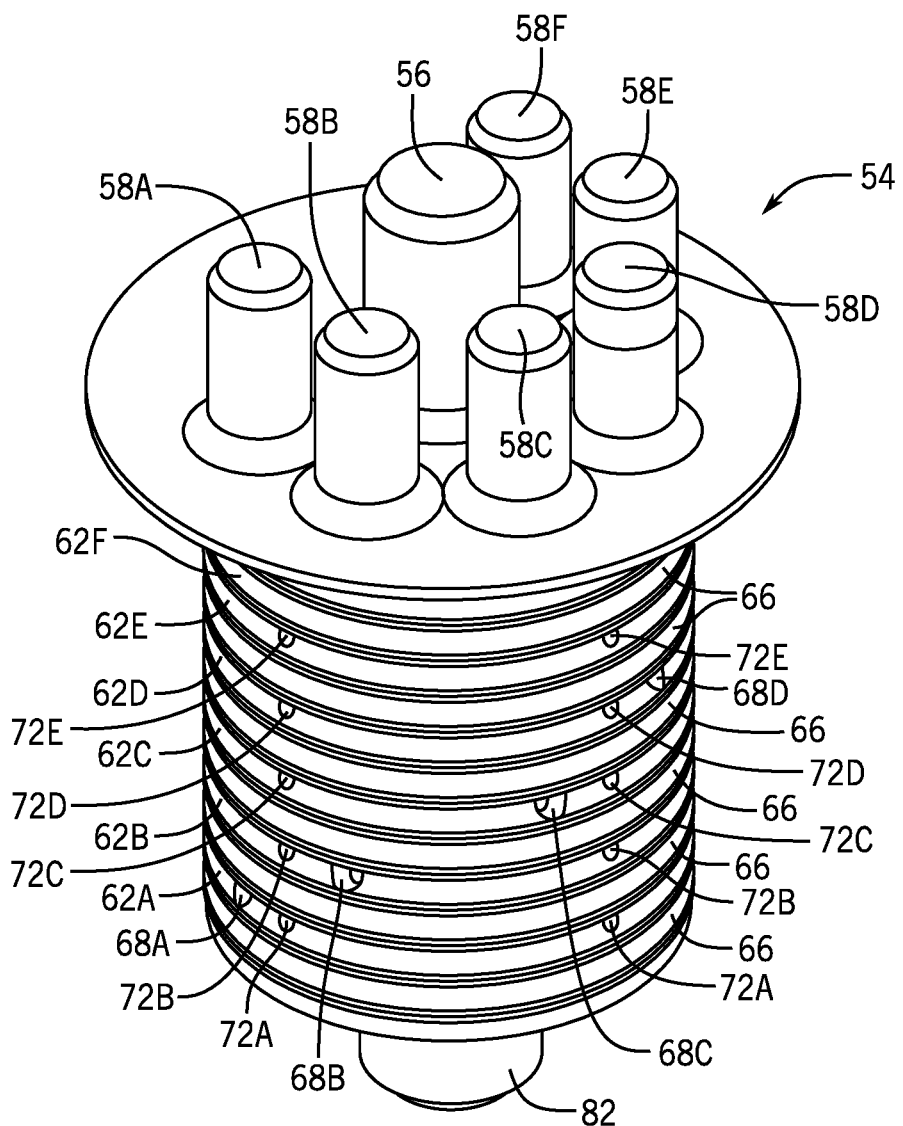
FIG. 5 depicts an exemplary embodiment of a nozzle insert.

FIG. 5 depicts an exemplary embodiment of the nozzle insert 54. In FIG. 5, the flavoring inlets 58 have been identified as flavoring inlets 58A-F as each flavoring inlet exemplarily is used to direct a different flavoring through the nozzle for the dispense of a condiment. As provided by the nozzle insert 54, each of the flavorings is directed through the respective flavoring inlet 58A-F into a flavoring channel 62A-F. The flavoring channels 62A-F are exemplarily annular channels formed in an exterior of the nozzle insert 54. The flavoring channels 62A-F are exemplarily separated by O-rings 64 or other gaskets or elastomeric seals which exemplarily reside in separation grooves 66 between each of the flavoring channels 62A-F.

Figure 6:
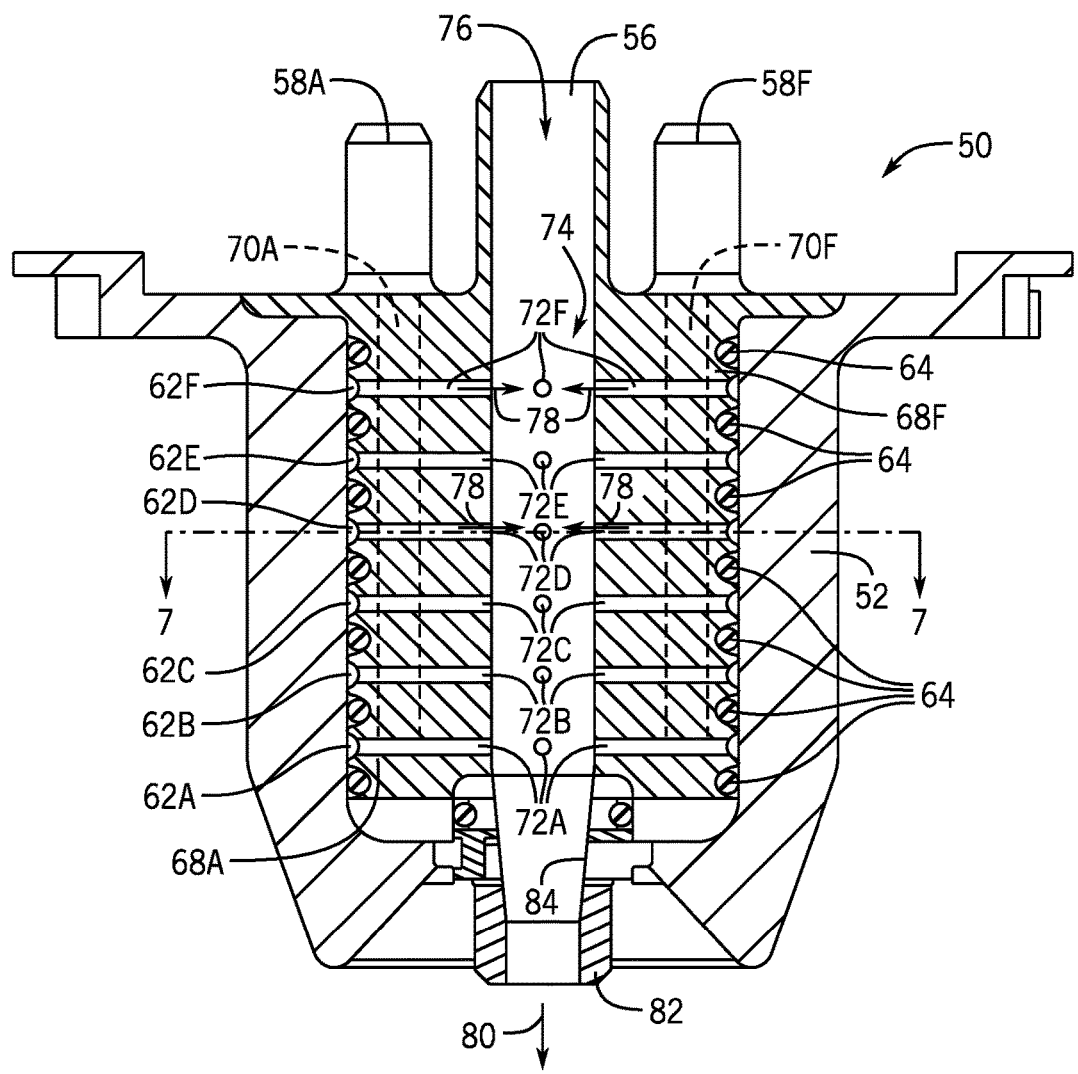
FIG. 6 is a cross-sectional view of the nozzle of FIG. 4 taken along line 6-6.
Figure 7:
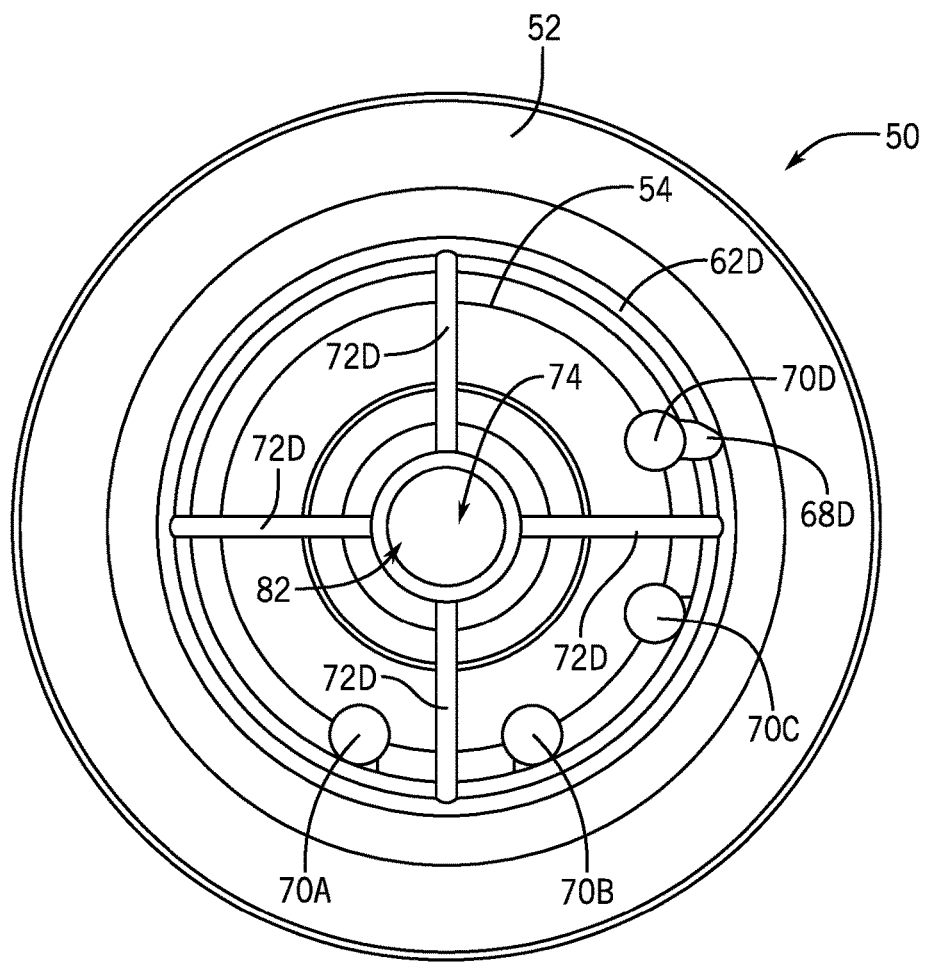
FIG. 7 is a cross-sectional view of the nozzle of FIG. 4 taken along line 7-7.

FIG. 6 is a cross-sectional view of the nozzle 50 taken along line 6-6 of FIG. 4. FIG. 7 is a cross-sectional view of the nozzle 50 taken along line 7-7 of FIGS. 4 and 6. Flavoring openings 68A-F connect the flavoring tubes 70A-F to the respective flavoring channels 62A-F. When a particular flavoring is to be used in mixing a custom food, it enters the nozzle 50 through the flavoring inlet 58 and down a respective flavoring tube 70 through the opening 68 into the flavoring channel 62. In the flavoring channel 62, the flavoring fills the channel 62 encircling the nozzle insert 54 within the respective flavoring channel 62. From the flavoring channel 62, the flavoring flows through passageways 72 (respectively 72A-72F) into a mixing chamber 74 of the nozzle 50. In an exemplary embodiment, the passageways 72 extend radially inwards from the flavoring channel 62 to the mixing chamber 64. In an exemplary embodiment, a plurality of passageways 72 are associated with each of the flavoring channels 62. In the exemplary embodiment depicted, four passageways 72 extend from each respective flavoring channels 62A-F and the passageway 72 are evenly spaced around the nozzle insert, exemplarily at 90 degree angles from one another. It will be recognized that other embodiments may include more of fewer passageways and such passageways need not necessarily be evenly distributed about the nozzle insert.

A flow of a base 76 mixes with a respective flow 78 of flavoring within the mixing chamber 74 to produce the custom condiment 78. The custom condiment 78 is dispensed out of the nozzle 50 through an outlet 80 at an end of the nozzle insert 54 exemplarily opposite at least one of the base inlets 56 and flavoring inlets 58. Exemplary embodiments of the nozzle 50 facilitate mixing flow of the base 76 and the at least one flavoring 78 in at least three ways. First, the flow of the flavoring 78 through the receptive passageways 72 produces jets of the flow of flavoring 78 which project the flavoring 78 into the interior of the flow of base 76. Next, the plurality of passageways inwardly directed to the mixing chamber 74 projects all of the flows of flavoring 78 into the middle of the flow of base 76. As previously described, this facilitates sheer mixing of the base with one or more flavorings. Additionally, a taper 82 restricts of the flow of the combined custom condiment 80. As the volumetric flow rate of the constituent base and flavorings remains constant or nearly constant, the restriction of the taper 84 increases the velocity of the combined custom condiment 80 which further increases the mixing of the constituent components.

In an alternative embodiment, the nozzle sleeve 52 may be exemplarily constructed in two pieces, for example a sleeve tube and a sleeve cap. In a still further exemplary embodiment, the sleeve cap may include the taper 84 rather than the nozzle insert 54. In another exemplary embodiment, the passageways 72A-F may further include inserts. In exemplary embodiments, the inserts may exemplarily be metal inserts which may further help to define the passageway, for example to further define a particular orifice size. In other exemplary embodiments, the inserts may be check valves or bust valves that limit the flow of flavoring when a particular flavoring is not being used in the present custom dispense. While FIGS. 4-7 depict an embodiment of the nozzle wherein the flavoring inlets are provided from the top of the nozzle, it will be recognized that in another embodiment, the flavoring inlets may be provided from the side, through the nozzle sleeve 52.

Figure 8:
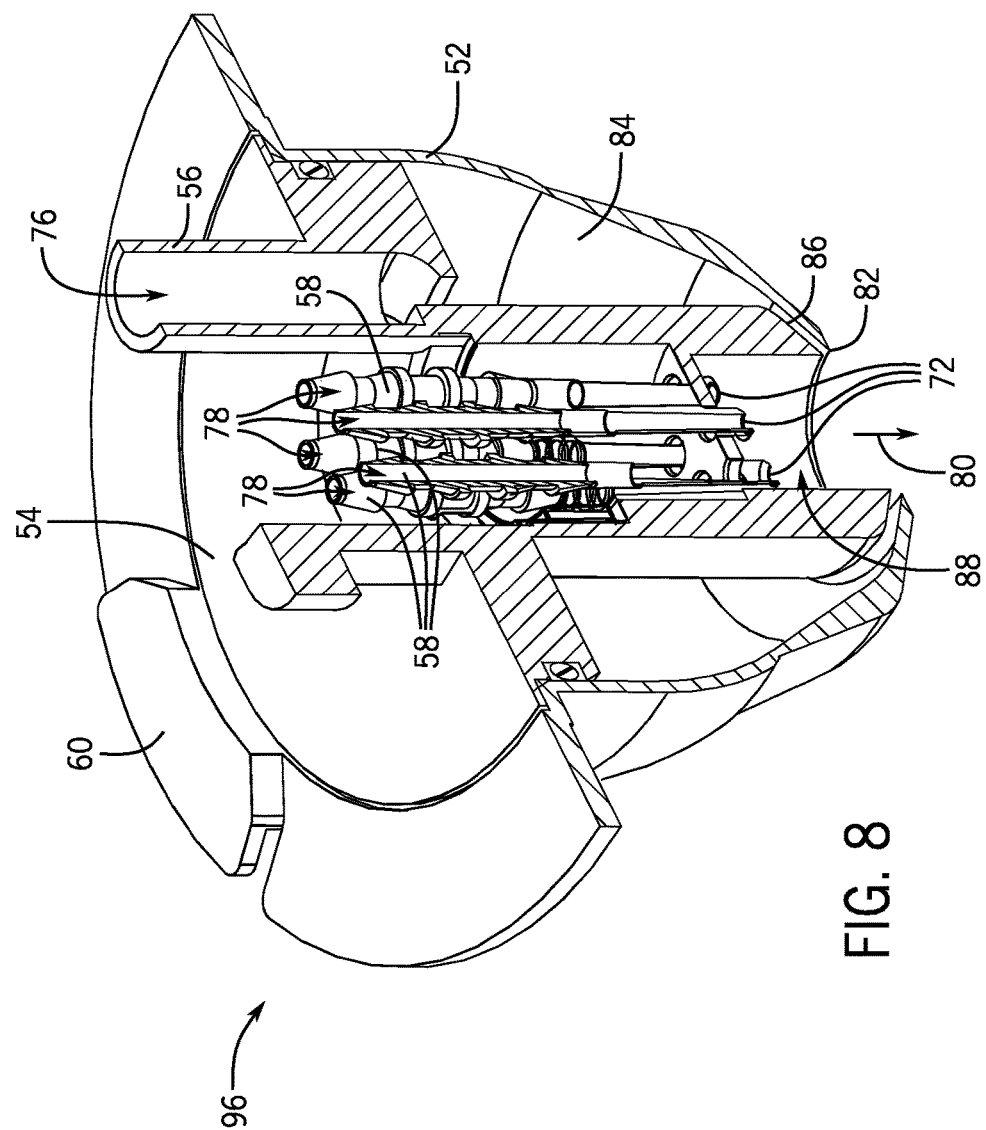
FIG. 8 is a cross-sectional perspective view of a further exemplary embodiment of a nozzle.
Figure 9:
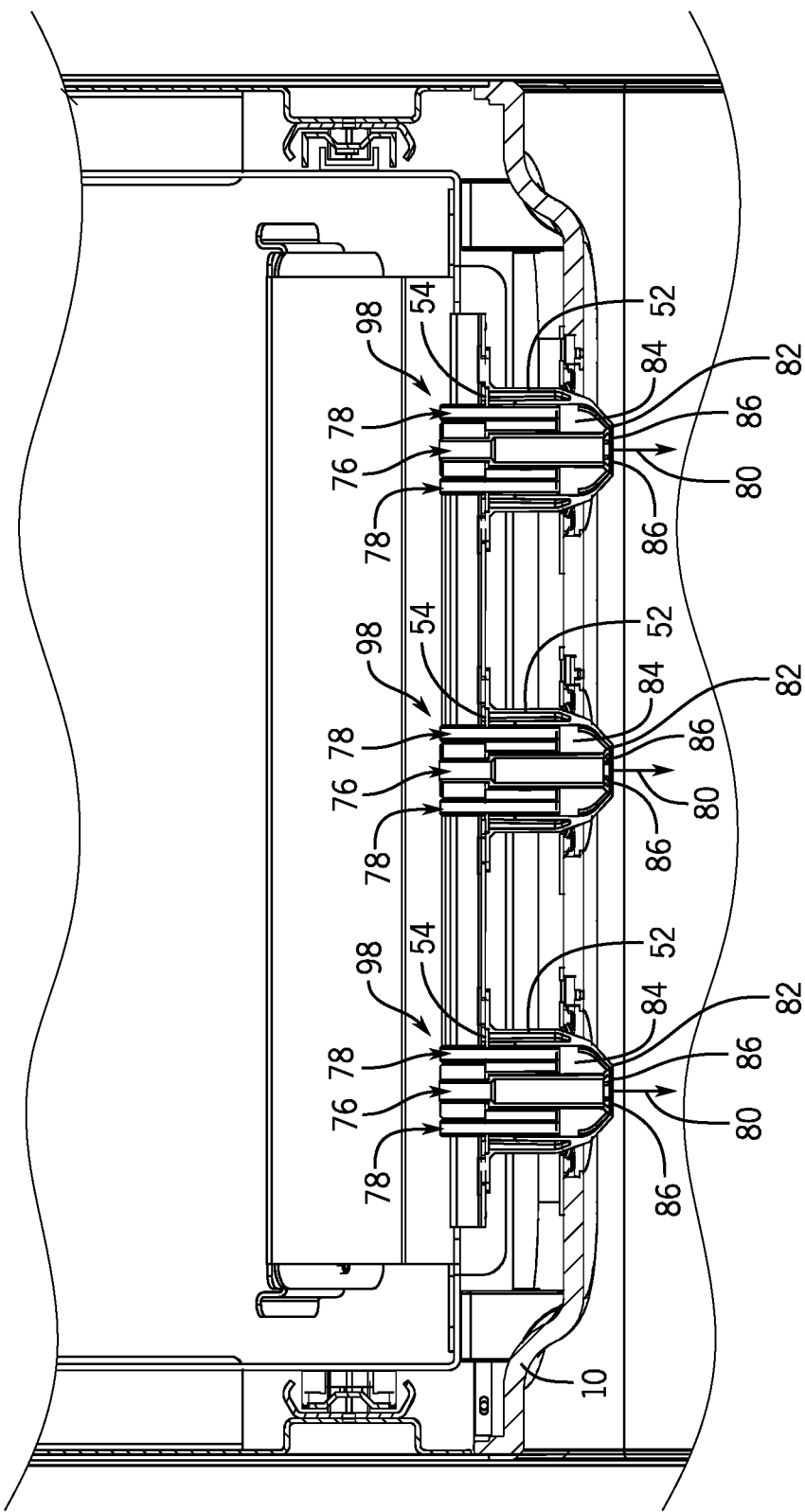
FIG. 9 is a front sectional view of exemplary embodiments of nozzles in a condiment dispenser.

FIGS. 8 and 9 depict cross-sectional perspective views of additional exemplary embodiments of nozzles as may be used to dispense custom foods such as condiments. The nozzles depicted in FIGS. 8 and 9 are similar in that in both embodiments, the base and flavoring are mixed by laminar mixing as well as by impact between the flows of the base and flavoring with the receptacle in which the custom condiment is dispensed. The nozzle 96 depicted in FIG. 8 surrounds the flow of flavoring(s) 78 with a laminar flow of the base 76. The nozzles 98 depicted in FIG. 9 surrounds the flow of base 76 with a laminar flow of the flavoring(s) 78. FIG. 9 further exemplarily provides a cross-sectional view of three nozzles 98 secured to a condiment dispenser 10.

The nozzle 96 of FIG. 8 receives the flow of base 76 through the base inlet 56 and receives the flow of flavorings 78 through respective flavoring inlets 58 located in the nozzle insert 54. The flavoring inlets 58 are located radially interior of the base inlet 58, exemplarily along a center axis of the nozzle insert 54. The flow of base 76 is received through the base inlet 58 into exterior chamber 84 defined between the nozzle sleeve 52 and the nozzle insert 54 and flows within the exterior chamber 84 around the nozzle insert 54. The nozzle sleeve 52 and the nozzle insert 54 are respectively tapered at a lower end to form an annular restriction 86. The flow of base 76 fills or partially fills the exterior chamber 84 and flows out of the nozzle outlet 82 in an annular sheet.

Both the angle with respect to the flavor injection axis and size of the annular orifice have an effect on the appearance and mixing of the pour, and may be differently dimensioned depending on the rheological properties of the food to be dispensed. The orifice size should be minimized to increase speed and smooth pulsation from the pumping system, but not so much that the pressure drop effects the quality of the food or restricts the flow rate below what is desired. If the orifice is too small and the food is optically translucent, the user may also be able to see the flavors through the annular sheet, which may be undesired. There may be an optimal orifice size for each type of food dispensed. Angle is also important, because depending on the exit speed of the orifice, the annular sheet may not be able to converge onto the flavor streams. Sizing the angle towards being perpendicular to the stream of flavors helps increase sheer mixing with flavors, but is less stable in maintaining a sheet of flow. Decreasing the angle creates a stable sheet, but may not converge and decrease the amount of shear mixing. There may be an optimal angle depending on the food item dispensed.

The flow of flavoring 78 is provided through the passageways 72 into an interior of the annular sheet of base produced by the annular restriction 86. The interface between the annular sheet of base and the flow of flavoring 78 causes sheer mixing between the constituent substances, but also creates a dispense of the custom substance with a uniform appearance of the annular sheet of base. The passageways 72 are exemplarily spaced apart from the nozzle outlet 82 and the annular restriction 86. The nozzle insert 54 exemplarily comprises an interior chamber 88 to provide this space. In embodiments, the interior chamber 88 can exemplarily provide a space for any buildup of flavoring and/or base to extend for example due to backpressure from the merging of multiple flows of constituent base/flavorings at the nozzle outlet 82. This space can prevent the flavoring and/or base to contact the passageways 72, which facilitates keeping the passageways 72 clean, clear from obstruction, and avoids carryover/flavoring contamination. In exemplary embodiments, the nozzle opening 82 may extend radially interior of the nozzle insert opening/interior chamber 88 to create a taper to further facilitate mixing between the base and flavoring(s). In an additional embodiment, multiple, exemplarily concentric nozzle sleeves, each create flowpaths for exemplarily additional base condiments. In this manner, multiple condiment bases, either alone or in combination with each other, as well as in combination with the one or more flavorings, can be dispensed from the same nozzle.

FIG. 9 depicts an exemplary embodiment of a nozzle 98, similar to that of the nozzle 96, although the base inlet 56 and the flavoring inlets 58 are switched, with the base inlet 56 axially aligned with the nozzle insert 54. In such an embodiment, the flavoring collects in the exterior chamber 84, while the base condiment flows through the interior chamber 88.

In exemplary embodiments, the nozzles may interface with the dispenser in a variety of ways. In one embodiment the flexible tubing of the system secures to barb fittings that friction fit into an elastomer base, designed to remain in place during system cleaning. The flavor pathways/base pathways into the nozzle are then provided as a removable piece, or diffuser, that friction fits into the elastomer base and is secured by twist-locking the outer nozzle onto the mount plate of the base. In another exemplary embodiment, the interface to the flexible tubing includes a base with integral barb fittings. The base may contain elastomeric or other types of check valves on the outlets to help protect the product during cleaning. The diffuser and nozzle then interface directly with the base, sealing pathways with an elastomeric gasket that is either a separate component or adhered/overmolded to the other components. The seal may be tightened by twist locking the nozzle. Elastomeric check valves may be molded directly into the gasket. In another exemplary embodiment, the interface between the base and the inner nozzle consists of ports sealed by o-rings. The female or male connectors may be on either the base or inner nozzle, and may be a mix. The flavors interface with the base via an elastomeric piece. The flavor tubing terminates in barb fittings that friction fit with the elastomeric pieces, and the elastomeric piece is overmolded, adhered, or friction fitted into the base. Then the rigid base as a whole fits into the inner nozzle. The exit orifices of the base may be protected by check valves. The entire assembly is held in place via twist lock. In a still further embodiment, the base interfaces with the inner nozzle via o-rings and the flavor tubes fit onto barbs designed into the nozzle base.

Another challenge in custom condiment mixing and dispensing is that of carryover of flavoring from a previous dispense into a subsequent custom condiment that uses different flavorings. Due to the relatively small volume of custom condiment as is contemplated to be dispensed, even a small amount of unrequested flavoring may negatively impact the taste and quality of the dispense product. Therefore, embodiments of the nozzle 14 and custom condiment dispenser further inhibit carryover of unrequested flavoring during dispense. In one embodiment, check valves 80 (FIG. 5) are exemplarily located at the ends of the flavoring inlets adjacent the mixing chamber 62. In non-limiting embodiments, these check valves 80 may be burst valves or other types of valves arranged to only permit flow of the flavoring when the flavoring is under the active pressure provided by the associated pump.

One cause of carryover is a Venturi effect created by the flow of base condiment 64 through the mixing chamber 62 which draws a flow of flavoring located in the flavoring inlet 70 into the mixing chamber 62 as the base condiment flows past. Another solution to carryover can be provided with further control of the dispensing process. In such a control, the dispense of the flow of the flavoring is ceased before the end of the dispense and instead a backpressure is created in the flavoring inlet 70 which draws base condiment into the flavoring inlet which creates a "seal" of base condiment to prevent flavoring from being drawn into the mixing chamber 62 by the aforementioned Venturi effect. The Venturi effect may draw the base condiment out of the flavoring inlet but carryover of the flavoring itself is limited or prevented. This back pressure may exemplarily be created by reversing the operation of the pump to create such back pressure or may be created by application of a vacuum (not depicted) to the flavoring inlet 70, exemplarily through the flavoring tube 78.

In still further embodiment, although not depicted, the nozzle opening 74 may be provided with a further check valve, particularly when the base condiment is a fluid food or low viscosity food, for example liquid butter, olive oil, or some types of ranch dressing.

Figure 10:
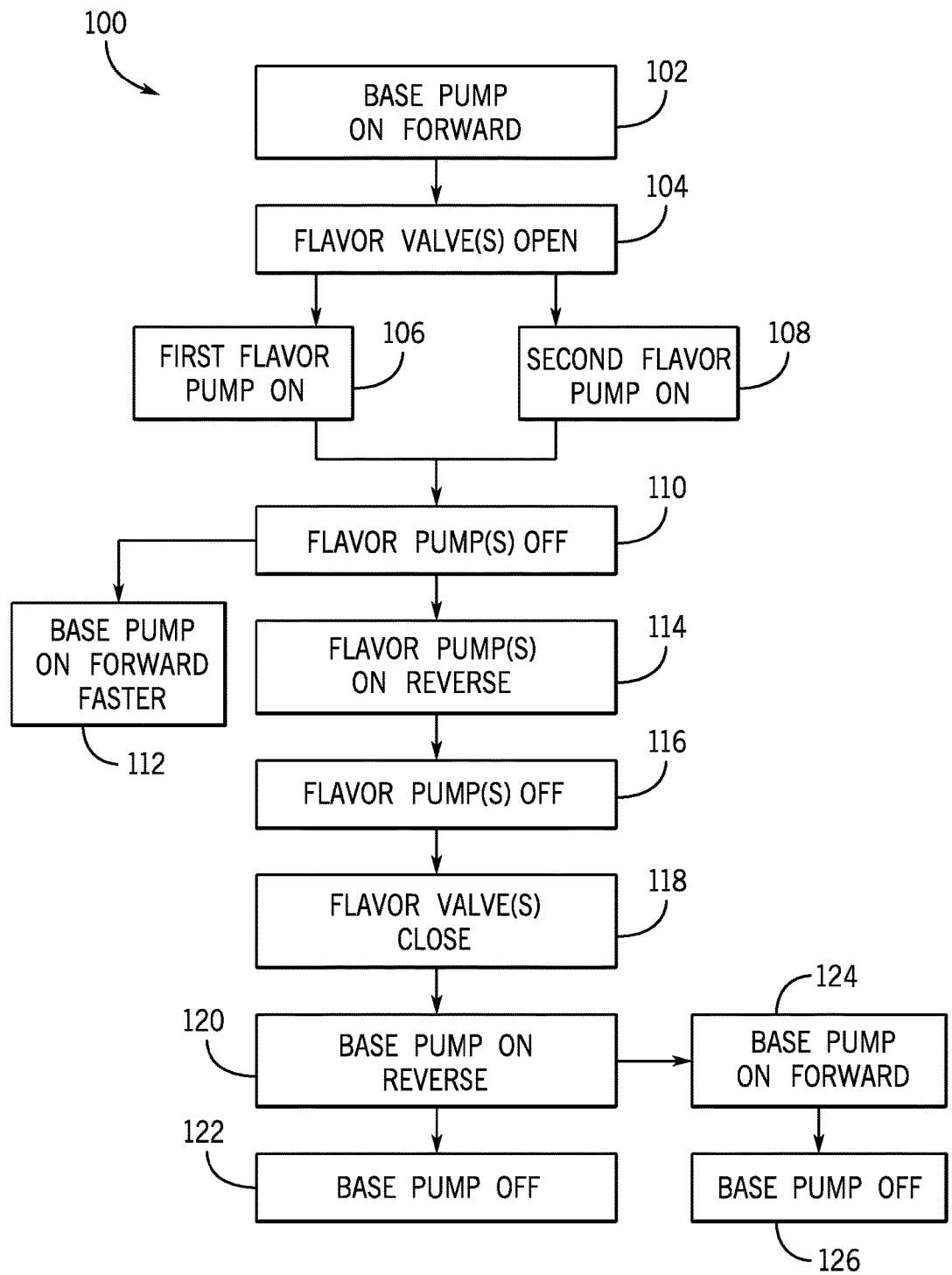
FIG. 10 is a flow chart depicting an exemplary embodiment of a method of dispensing a custom condiment.

FIG. 10 is a flow chart that depicts an exemplary embodiment of a method 100 of dispensing a custom condiment. As described above, the user interacts with a graphical user interface of the custom condiment dispenser to exemplarily make a selection of a base condiment and at least one flavoring to be added to the base condiment. In still further exemplary embodiment, an intensity of the flavoring may also be selected by the user. When the user is ready for the custom condiment to be dispensed, the user selects the dispense button exemplarily in the GUI and a dispense signal is provided to a controller of the custom condiment dispenser which operates to carry out the functions of the method 100 as described herein by providing one or more control signals to various components of the custom condiment dispenser. The description of the method 100 provided herein will be with reference to components of the custom condiment dispenser as exemplarily depicted in FIG. 2.

The controller 44 first provides a control signal to a pump associated with the base condiment. The base condiment pump is operated at 102 to pump base condiment forward towards the nozzle 14. In an exemplary embodiment as noted above, the pumps used in the custom condiment dispenser may exemplarily be peristaltic pumps, although it will be recognized that in other embodiments other forms of pumps may be used. In an exemplary embodiment, the pumps may be set to a unique speed and dispense time for each base condiment. These settings may exemplarily be experimentally determined based upon the specific base condiment. In embodiments this may be controlled to optimize the jet of dispensed condiment to be straight with reduced pulsation within comparable times for each of the base condiments. It will be recognized that in other embodiments, other dispensing control systems, for example using gravity feed or pressurized dispensing systems may be used and while such embodiments may not include the use of pumps, a person of ordinary skill in the art will recognize that the method 100 described here may be similarly applied to those pumping systems as well.

At 104 the controller provides signals to one or more flavor valves 43 associated with the one or more flavorings selected by the user. In an exemplary embodiment described herein, the user has selected two flavorings to be added to the based condiment, although it will be recognized that in other embodiments, one flavoring or more than two flavorings may be selected and added. In a still further embodiment, multiple flavorings may be added sequentially. This may be done for example based upon the aesthetic of the custom condiment exiting the nozzle. In an exemplary embodiment, as described above, a single pump is associated with each of the available flavorings, while the flexible tube 45 may be directed to multiple nozzles and dispensing systems. Therefore, the flavor valves associated with the dispensing system for the selected base condiment are opened at 104 while the flavor valves for the same flavorings associated with a not selected base condiment and dispensing system remain closed.

After the appropriate flavoring valves are opened at 104, the controller 44 provides at least one control signal to the pump associated with the first flavor 106 and the pump associated with the second flavor at 108 to turn on those pumps associated with the selected flavorings. In an exemplary embodiment, the control signal provided to the flavoring pumps may further include or be provided in combination with a further control signal that represents a speed at which the flavoring pump is to operate. In an exemplary embodiment, the user selected intensity is provided in the custom condiment by providing an increased volume of the flavoring relative to the dispensed base condiment. Thus, in embodiments if the overall time for the dispense is held constant independent of the intensities of flavorings, then the flavoring pump must operate faster to dispense a larger volume of the flavoring into the base condiment during the dispense to produce a more intense flavor of the custom condiment. In an exemplary embodiment the overall time of the dispense may not be held constant between condiments. This may be the where the dispensed food is highly viscous and therefore must be pumped at a comparatively lower flow rate. In such an embodiment different flavor intensities may require a longer or shorter overall dispense time. In another exemplary embodiment, different flavorings may further have different flavoring volumes associated with each of the available intensity levels. In still further exemplary embodiments, differences in viscosity between the flavorings themselves may further require different pump speeds to dispense the volume of flavoring associated with the requested intensity of that flavoring. In a non-limiting embodiment, the pump speed may be represented as a revolution per minute (rpm) of the pump or has a voltage associated with a particular pump rpm. In a further embodiment, a control signal may provide an acceleration to the pump during start-up of the pump rather than operating the pump at a constant speed. An acceleration to the pump at the start of the dispense may gradually increase the flow rate over the course of the dispense which may further improve the aesthetic of the dispense.

Once the base pump, and requested flavoring pump(s) are operating, the system operates those pumps for a length of time needed to dispense the requested dispense volume of the custom condiment. In one exemplary embodiment the custom condiment is dispensed in a predetermined dispense volume upon the user selection of the dispense button in the GUI. In another exemplary embodiment, the user further inputs a requested dispense volume before requesting dispense of the custom condiment. In a still further exemplary embodiment, the custom condiment is dispensed so long as the user continues to engage the dispense button. In any of the above-noted embodiments, upon nearing the end of the dispense of the custom condiment, whether such volume was predefined or when the user disengages from the dispense button, the method 100 continues at 110 to turn off the flavor pump. In an exemplary embodiment, the dispense is minimized to the shortest amount of time possible to reasonably provide a flow of base condiment after the flavoring is stopped to clean the pathway of the nozzle of any residual flavoring from the dispense. In embodiments, this helps to avoid wasted product and helps to provide a consistent aesthetic of the dispensed product in instances where the flavoring adds color to the base.

Depending upon the particular base condiment being dispensed, the method 100 may optionally further control the base condiment pump to pump forward faster (e.g. at a faster pump speed and flow rate) at 112. In some embodiments, this control to increase the speed of the base condiment pump further includes an intermediate step of briefly turning off the base condiment pump before starting the base condiment pump again at the new, faster, speed. In an exemplary embodiment, the optional use of this step may be used when the base condiment is of a lower viscosity or dependent upon nozzle geometry. In a merely exemplary embodiment, ketchup has a viscosity of about 50 PaS while ranch dressing has a viscosity of about half of that (about 25 PaS). Barbeque sauce may exemplarily have a viscosity between that of ketchup and ranch dressing. In an exemplary embodiment, base condiment with a lower viscosity, for example, ranch dressing, may need to increase the flow rate of the base condiment to compensate for the volumetric flow lost by turning off the flavoring pumps, as well as to compensate for operating for the flavor pumps in reverse as will be described at 114. Speeding up the base pump is also used to disguise the plain base in the dispense target when flavoring adds color to the product. When the base jet is sufficiently fast, it injects past the surface of the product in the portion cup and is hidden by the surface of mixed product. If the base jet is too slow, it will layer on top of the already mixed product, decreasing perception of homogeneity. The increased speed also reduces necessary flavor flush time, and thus the amount of time the user sees the differently colored base. Thus, speeding may be used on all bases to help with pour aesthetic.

However, it will be recognized that in other embodiments, the base pump may be maintained at a previous pump speed and no adjustment to the pump speed is needed. For example, in the dispense of ketchup and/or barbeque sauce. It will be recognized that if the base condiment pump is operated to a faster pump speed at 112, that the base condiment may be dispensed for a brief period to reestablish flow of the base condiment through the nozzle before the flavor pumps are operated in reverse at 114.

As noted above, in another embodiment, the control of the pumps is in part based upon the geometry of the nozzle used to mix and dispense. While the geometry of the nozzle may be in part dependent upon the viscosity of the base food to dispense, these considerations may be independent. For example in the nozzle exemplarily used to dispense the ketchup and barbecue sauce, the streams of base and flavoring converge in the atmosphere and there is no restricting orifice affecting the flow rate of the stream when the flavors are turned off. Thus the speeds of the base and the flavoring streams act fairly independently of one another because they converge with little restriction to their flow, so the speed of the base does not change very much when the flow of flavoring is turned off. However, in an embodiment of the nozzle exemplarily used to dispense the ranch base, the base and flavoring mix inside the nozzle and exit out of the same restricted orifice, all at the same speed at which they are converged within the nozzle. Therefore, when the overall flow rate is reduced because the flavors are turned off, the velocity out of the orifice decreases, causing increased pulsation and poor mixing upon dispense. Therefore, in embodiments, the pump associated with the base is sped up to compensate for this volumetric loss to maintain the speed of the dispense through the nozzle orifice. In embodiments, this may improve the aesthetic of the dispense and reduce the amount of time needed to flush the flavor out of the nozzle.

As mentioned above, it is desired to avoid carryover of flavorings into the base condiment in a subsequent dispense, as carryover flavor may impact the appearance, texture, or flavor of a subsequently requested custom condiment. At 114 the flavor pumps are operated in reverse for a brief time to draw a small amount of the base condiment into the flavoring inlets 70 to form a seal comprised of the base condiment across the flavoring inlet 70. Thus, during a subsequent dispense, any Venturi effect from the flow of the base condiment and/or flavorings past the unused flavoring inlets draws additional base condiment from the base condiment seal rather than flavoring. After the flavor pumps are operated in reverse at 114, the flavor pumps are turned off at 116. After the flavor pumps are turned off at 116, the flavor valves 43 are closed at 118 to return the condiment dispenser to a state wherein all of the flavor valves are closed. The base pump may continue to operate for a brief time to flush any remaining flavoring from the nozzle 14 and/or a mixing chamber of the nozzle 14. In an embodiment, a control signal may be sent to decelerate the pumps instead of turning the pumps off immediately. This may gradually reduce fluid momentum in an effort to reduce post dripping after the pump is stopped.

Next, the base pump, upon control from the controller, is operated in reverse at 120. It will be recognized that in carrying out this function, the base pump may operate in two steps, namely first the forward operation of the pump is stopped then the pump receives a control signal to operate in reverse and then begins to pump the base condiment in reverse. This helps to stop overrun and/or dripping of the base condiment to create a distinct end to the dispense of the custom condiment. In an embodiment, the dispense of the custom condiment is complete and the base pump is turned off at 122. In embodiments, the change in fluid momentum from reversing the flow can help to shake and loosen any forming drips quickly in addition to forming the vacuum seal. In another embodiment, instead of operating in reverse, the base pump may receive a signal to decelerate instead of immediately turning off and reversing. This may reduce post drip by gradually reducing line pressure.

In an alternative embodiment, in part depending upon a viscosity of the condiment, operating the base pump in reverse at 120 can create a vacuum on the supply line of the base condiment, which can lead to sputtering or inconsistent dispense of the base condiment during a subsequent dispense. This may particularly be the case when the base condiment has a higher viscosity. Therefore, at 124, the base pump is again briefly operated in forward to relieve the vacuum in the line and prepare the base condiment for a subsequent dispense. Finally, at 126 the base pump is turned off and the dispense of the custom condiment is complete.

The exemplary embodiment of the method 100 is intended to be merely exemplary and will be recognized by a person of ordinary skill in the art that various embodiments of the method as disclosed herein may include more or fewer steps than those described.

It will further be recognized that in an embodiment, the pump speeds for both the base condiment pumps as well as the flavoring pumps and also the length of time for which the pumps are operated in the various conditions as described herein may be stored in a look up table with predefined values which may reflect standard values or in embodiments may be specific to a quality (e.g. viscosity) of the particular base condiment or flavoring. It will be recognized that in alternative embodiments, one or more of these parameters and values may be controllable by a user and that further adjustments to the specific values may be made in combination. In embodiments, one or both of a pump speed and a length of dispense time may be adjusted to dispense volume and/or dispense ratios.

In a still further exemplary embodiment, the temperature sensor of the custom condiment dispenser may be used to provide one or more measurements of temperature either within the custom condiment dispenser, or of particular base condiments and/or flavorings. It will be recognized that in embodiments, one or more known temperatures may be used to adjust pump speeds and/or lengths of dispenses to account for temperature-base variability in the viscosity and/or other properties of the base condiment and/or flavorings.

In a still further embodiment, as described above, a proximity sensor in association with the nozzle may provide a further control feedback, limiting dispense of the custom condiment to only times in which a receptacle is sensed in proximity to the nozzle to receive the dispense custom condiment.

As mentioned above, while not limiting on the scope of the present disclosure, embodiments of the custom condiment dispenser are contemplated for dispense of small volumes of custom condiments. Three exemplary use cases exhibit the types of small volumes of custom condiments contemplated as opposed to other food processing solutions which use a bulk processing method for flavored sauces. In one embodiment, the custom condiment dispenser dispensed the custom condiment directly onto a piece of food, for example a hamburger, a hot dog, or a sandwich located in the dispensing area below the nozzle. In another embodiment, the custom condiment is dispensed into a portion cup to be provided to a customer along with a food order. In both of these two examples, the contemplated dispense volume may be between 0.5 oz to 2.0 oz. In a still further embodiment, the custom condiment dispenser may be used in a "behind-the-counter" use to make specialty sauces which are dispensed into a dispensing container (e.g. a ketchup bottle) either for use by a food preparation worker to dispense onto prepared food or for placing at a table or station for use by a customer. In a nonlimiting embodiment, such volumes of dispensing containers may exemplarily be 6 oz-12 oz. These disclosed ranges are merely exemplary of potential uses of the disclosed custom condiment dispenser, it will be recognized that alternative embodiments may be used to dispense between 2 oz and 6 oz, or other volumes above or below this range.

Particularly with the dispense of a custom flavored condiment in the dispense volume range between 0.5 and 2.0 oz, the challenges notes above create laminar mixing at low flow rates is increased, particularly to provide consistently flavored custom condiment from the start of the dispense. With a small volume of total product, the volume of the base condiment and the flavoring are sufficiently small that creating the flow qualities needed for mixing.

In exemplary and non-limiting embodiments, the custom condiment dispenser may be self-cleaning or partially self-cleaning. In an embodiment wherein the custom condiment dispenser is connected or connectable to a water supply and a water disposal line, for example as may be provided by appropriate connections to the plumbing of a restaurant or other food service, convenience, or vending establishment. In such an embodiment, the custom condiment dispenser may be operable (for example under the control of the processor after input of an option or cleaning command by a user) to draw water into the custom condiment dispenser, flush the flexible tubes of condiment and dispense of the dirty water. In a still further embodiment, the self-cleaning may be semi-automated, requiring fluid connections to be made by the user between the custom condiment dispenser and fresh water, solvent water as well as to connect the nozzles to a plumbing drain. Upon receipt of a command from a user, the custom condiment dispenser by draw solvent water into the system to flush and clean the flexible tubing, nozzles, flavoring and/or condiment inlets, pumps, and/or valves or any other component that comes in contact with the dispensed food and/or flavorings. After solvent water is distributed through the system, fresh water may be circulated through the system to remove any loosened food as well as to flush the system of the solvent water. The used solvent water and/or the used fresh water may be dispensed into a drain through the nozzles, cleaning the nozzles as well.

In an exemplary embodiment, upon receiving an input exemplarily through a QR code read by the auxiliary input device, the custom condiment dispenser may enter into a set up or maintenance mode, whereby a technician gains access to controls, settings, code scripts, or other variables relied upon by the custom condiment dispenser 10 to function properly. This may exemplarily be used to switch the settings to reflect a change in base condiment, a change in flavorings, or to adjust for a geometry of a new nozzle or other component.

In other exemplary embodiments, upon receiving an input, exemplarily a QR code read by the auxiliary input device 18, the custom condiment dispenser may carry out a function, for example to initiate a cleaning routine. The cleaning routine may be carried out automatedly if cleaning solution and disposal capabilities are already provided to the custom condiment dispenser. In an alternative embodiment, as part of the cleaning routine initiated by the input to the auxiliary input device, the graphical display may be operated to provide a user with instructions for manual portions of a cleaning routine in a semi-automated process.

FIGS. 11A-11D depict an additional exemplary embodiment of a graphical user interface (GUI) 23. The graphical user interface 23 depicted in FIGS. 11A-11D includes similar features as highlighted above with respect to the graphical user interface 22 of FIG. 3. These features are identified with like reference numerals for the sake of conciseness. The GUI 23 differs from the GUI 22 in that the GUI 23 is configured to operate across a plurality of screens based upon user selections rather than incorporate all of the user controls into a single screen.

In the first screen 23A, the customer is presented with the options of base condiments 24. In this exemplary embodiment, the base condiments are ketchup, ranch, and barbeque sauce. Selection of the auxiliary input button 25 by the customer will enable the auxiliary input device 18, as described above, to receive an input, for example of a recipe ID in the form of a QR code to select a custom condiment for dispense.

Figure 11A:
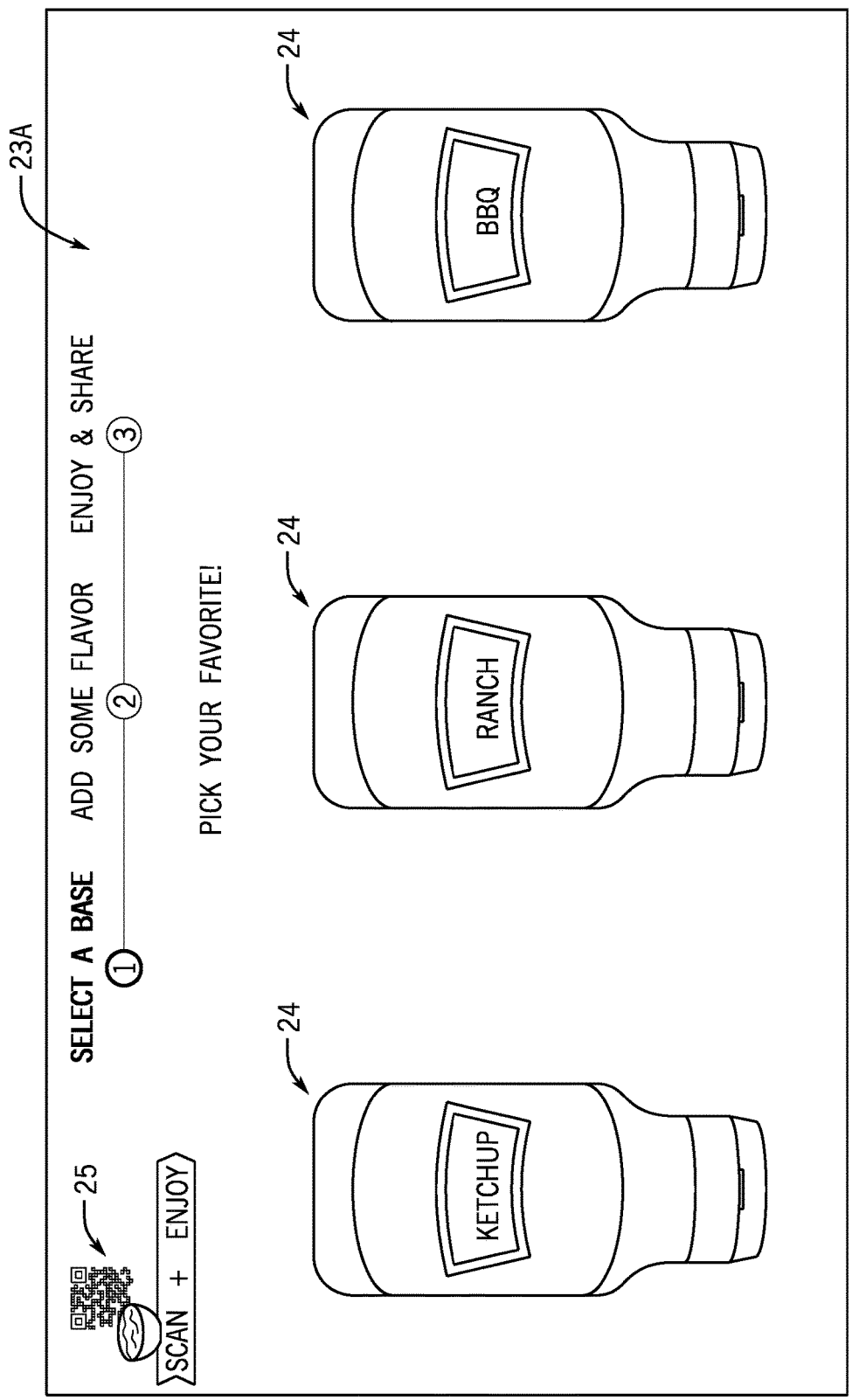
FIGS. 11A-11D depict exemplary embodiments of user interfaces for a custom condiment dispenser.
Figure 11B:
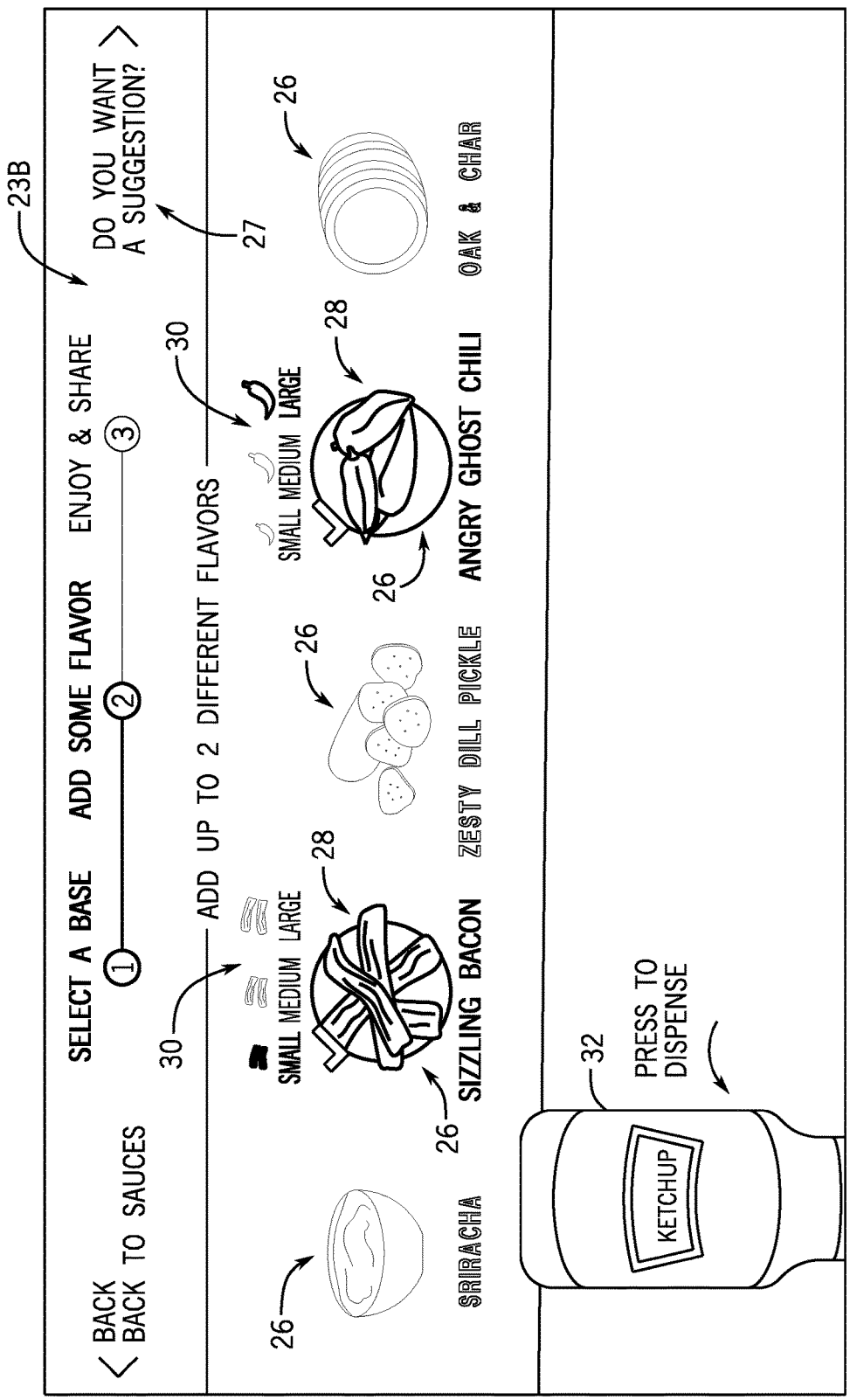
Figure 11C:
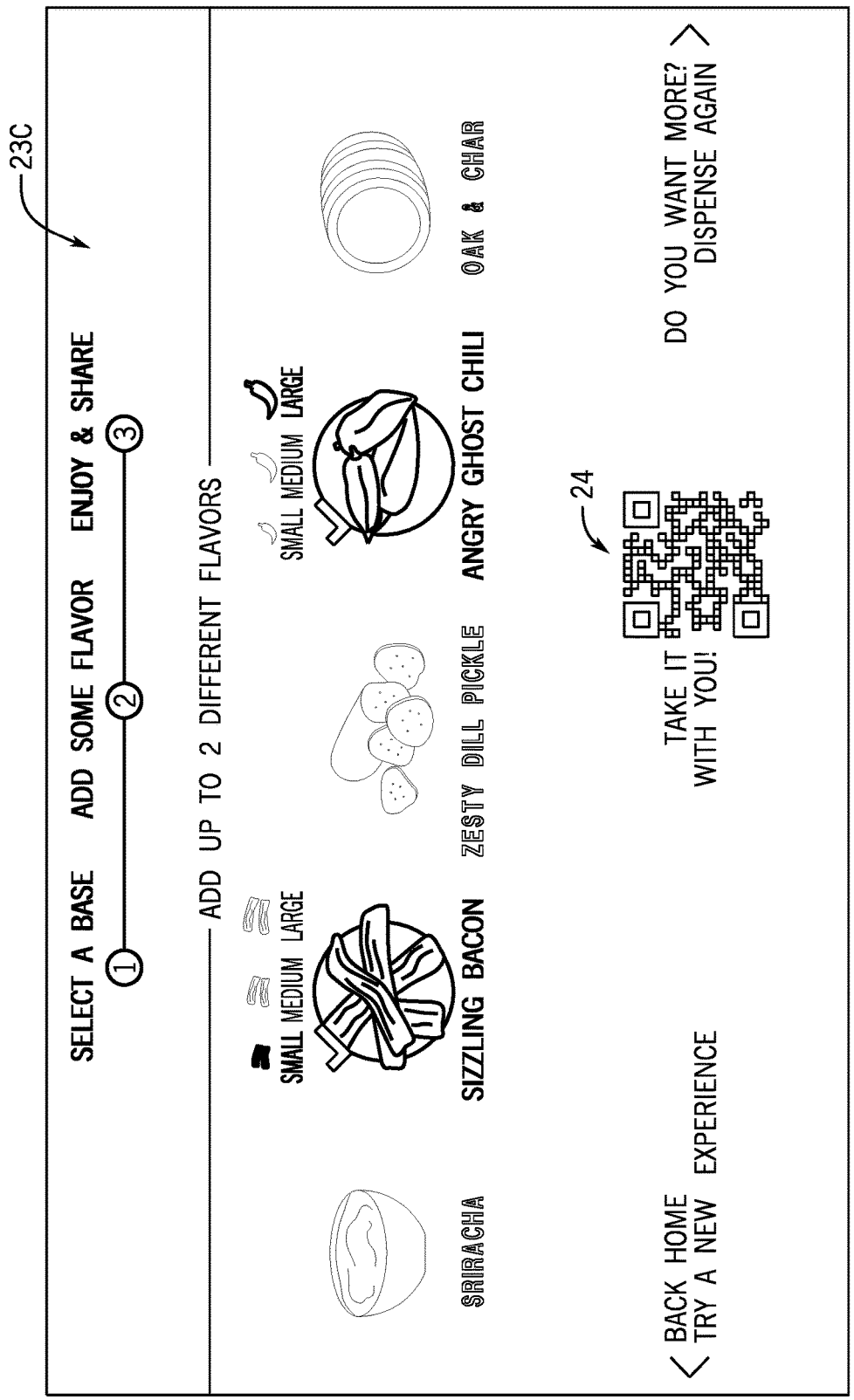

Upon receiving a selection of a base condiment 24 by the customer, the GUI navigates to a second screen 23B depicted in FIG. 11B. In the exemplary embodiment, the customer has selected ketchup and the customer is presented with a plurality of flavoring buttons 26 representing different flavors which may be added to the selected base condiment of ketchup. In the example presented, the flavorings are sriracha, sizzling bacon, zesty dill pickle, angry ghost chili, and oak & char. When the customer selects one or more of the flavoring buttons 26, the selected button becomes a highlighted button 28, indicating back to the customer, the customer's current selections. In this example, the customer has selected sizzling bacon and angry ghost chili. Once a flavoring is selected, then an intensity indicator 30 is presented in connection with the highlighted button 28. The customer may select from e.g. small, medium, or large amounts of the flavoring, wherein the customer has exemplarily selected a small amount of sizzling bacon and a large amount of angry ghost chili. Upon the selection of the flavorings and intensity for the custom ketchup, the customer selects the dispense button 32 to dispense the custom ketchup. In an exemplary embodiment, a separate nozzles may be used to dispense each of custom ketchup, custom ranch, and custom barbeque sauce. As depicted in the GUI 23 the positioning of the base condiment buttons 24 and the dispense button 32 may related to the position of the associated nozzle to help customers accurately receive the dispensed condiment.

After the custom condiment is dispensed, the GUI exemplarily navigates to third screen 23C, in which the recipe for the dispensed custom sauce is presented and the recipe ID 34, which is exemplarily in the form of a QR code presented to the customer. As described above, the customer may take a picture of the recipe ID 34, send it to themselves or others, or share it through social media platforms.

Figure 11D:
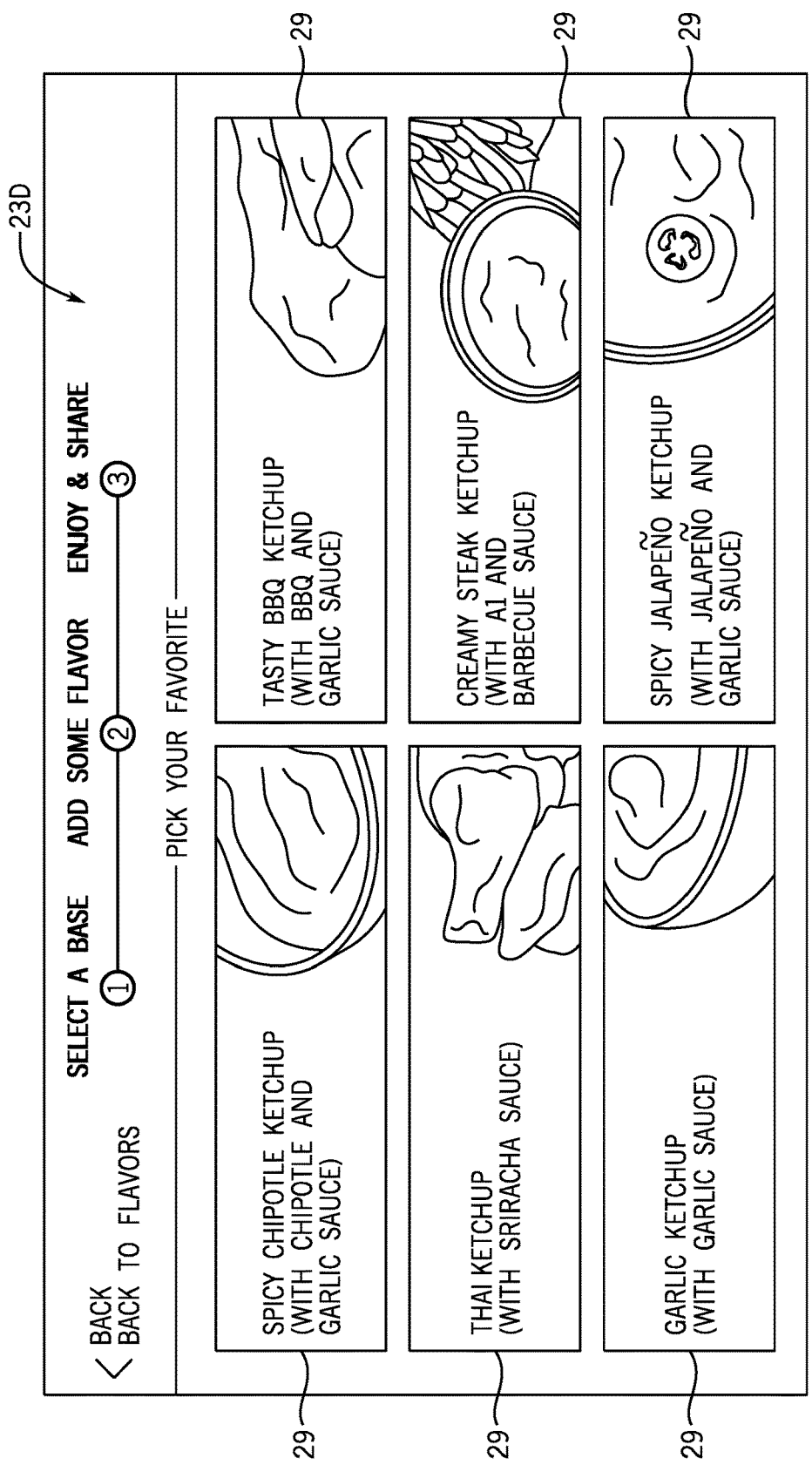

FIG. 11D presents an exemplary embodiment of another screen 23D of the GUI. Referring back to FIG. 11B, a suggestion button 27 prompts the customer to be presented with preconfigured custom condiment recipes. Upon selection of the suggestion button 27 by the customer, the GUI navigates to screen 23D to present a plurality of predefined custom condiments from which the user may choose by selecting a custom condiment button 29. In the example depicted, various predefined custom ketchup flavors are presented. It will be recognized that each of the custom condiments represented by each of the custom condiment buttons 29 themselves have an underlying recipe comprising at least one base condiment and at least one portion of flavoring. In exemplary embodiments the custom condiments may comprise the base condiment and flavorings available through the system. These custom condiments may be proprietary to a particular restaurant or group of restaurants. In still further embodiments, one or more of the presented selections may be dispensed from the custom condiment dispenser using premixed or on demand mixed custom condiment. In one embodiment a customer selection of one of the custom condiment buttons 29 navigates the customer to a screen similar to screen 23B to dispense the selected custom condiment is dispensed on a further user selection of the dispense button 32. In a still further embodiment, the dispense button 32 may be eliminated and the custom condiment is dispensed upon selection of a particular custom condiment button 29.

Figure 12:
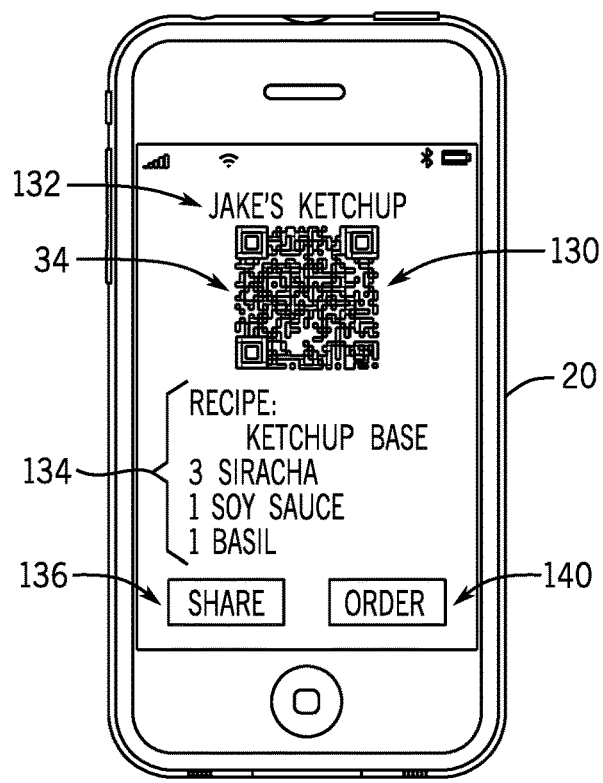
FIG. 12 exemplarily depicts a mobile device with an exemplary embodiment of an app screen shot.

FIG. 12 depicts an exemplary embodiment of a mobile computing device 20, which is exemplarily a smart phone and presents an exemplary embodiment of an app GUI 130 presented on the mobile computing device 20. The app GUI 130 exemplarily presents the recipe ID 34 in a prominent manner. In an exemplary embodiment, and as described in further detail herein, a user may use this representation of the recipe ID 34 to be read by the auxiliary input device 18 of the custom condiment dispenser 10 (FIG. 1) on a subsequent visit to enter the custom condiment rather than provide individual selection with the user interface of the custom condiment dispenser. The app GUI 130 may be used to create a name 132 for the custom condiment. The app GUI 130 further may include a detailed recipe 134 corresponding to the custom condiment represented in the recipe ID 34. As previously discussed, the user may share the recipe ID or the custom condiment either through social media or through direct communication forms including, but not limited to e-mail and text messaging, for example by selecting the share button 136.

Figure 13:
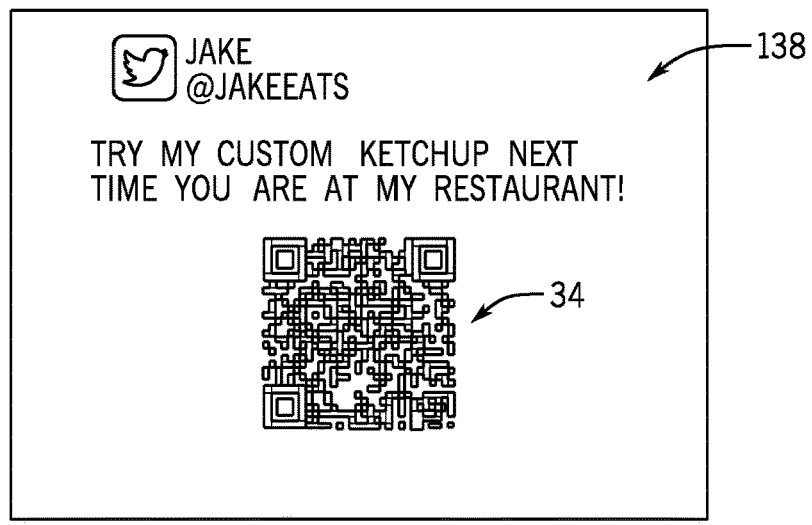
FIG. 13 exemplarily depicts a screen shot of a social media post.

FIG. 13 depicts an exemplary embodiment of a screen shot of a social media post 138 which includes the recipe ID 34. By sharing the recipe ID 34 on social media, other third party followers of the user can acquire the recipe ID 34 and use that recipe ID 34 to order the same custom condiment produced by the custom condiment dispenser as the original user.

Referring back to FIG. 12, an order button 140 may exemplarily provide a link to an online ordering functionality within the app or another app associated with the restaurant, or connect to ordering functionality through the Internet for mobile ordering. As described in further detail herein, in embodiments, the user may incorporate the recipe ID 34 into an online order and the recipe ID 34 may be used by a restaurant or food service worker to prepare the order and include the custom condiment as defined by the recipe ID 34.

Figure 14:
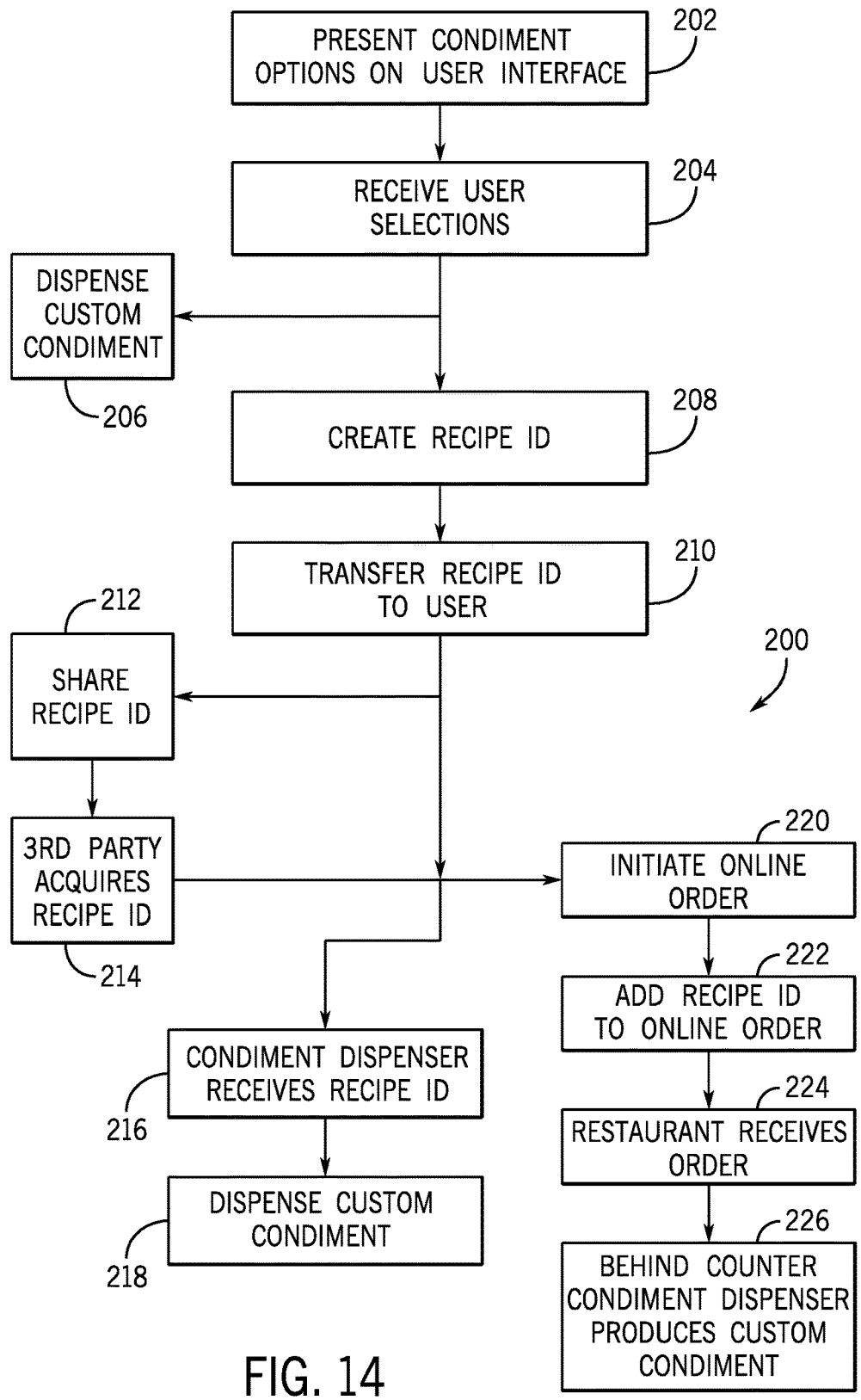
FIG. 14 is a flow chart that depicts an exemplary embodiment of a method of custom condiment dispensing.

FIG. 14 is a flow chart that depicts an exemplary embodiment of a method 200 of custom condiment dispensing. It will be understood that exemplary embodiments of the method 200 may be carried out through the use of one or more of the structures and/or user interfaces as described above, although persons of ordinary skill in the art will also recognize other manners of carrying out the method 200 as described herein in accordance with the disclosure.

At 202 condiment options are presented on a user interface. In exemplary embodiments the condiment options may be selections of base condiments and flavorings from which the user may make selections or the condiment option may be a plurality of predefined custom condiments from which the user is able to select. At 204 the custom condiment dispenser receives user selections from the presented condiment options. The custom condiment dispenser operates at 206 to dispense the requested custom condiment. At 208 a recipe ID is created and presented to the user. The recipe ID may exemplarily be a one-dimensional or a two-dimensional barcode or another form of a numeric code that is representative of the condiment selected by the user.

The recipe ID is transferred to the user at 210. As previously described, the recipe ID may be transferred to the user in a variety of ways including, but not limited to reading or capturing the recipe ID presented on the GUI of the custom condiment dispenser, exemplarily with a mobile computing device such as a smart phone. In other embodiments, the recipe ID is transferred to the user exemplarily through e-mail or by a wireless communication to an associated app or to a mobile computing device. At 212 the user has the option to share the recipe ID with others, exemplarily through social media, for example Facebook or Twitter, as well as through e-mail or text messaging platforms. The sharing of the recipe ID at 212 by the user can be carried out either though the user interface of the custom condiment dispenser itself or through an app associated with the user in the custom condiment dispenser operating, for example on a mobile computing device.

At 214 one or more third parties acquire the recipe ID shared by the original user. After acquiring the recipe ID, the third party may use the recipe ID in any of the same manners as the original user for whom the recipe ID was originally created as will be described in further detail herein.

At 216 the recipe ID may be used to facilitate operation of the custom condiment dispenser for example by providing the recipe ID to the auxiliary input device 18 of the custom condiment dispenser. In an exemplary embodiment, the recipe ID may be a QR code and the auxiliary input device 18 is a QR code reader. However, in other embodiments, other methods of data transfer may be used. For example, the auxiliary input device may be a wireless communication device operating exemplarily on a Wi-Fi or Bluetooth communication protocol and through which a mobile computing device of the user may transmit the recipe ID to the custom condiment dispenser. Further embodiments may exemplarily use near-field magnetic inductance or infra-red communication in order to transfer the recipe ID. Once the custom condiment dispenser receives the recipe ID, the custom condiment dispenser can be operated to dispense the custom condiment at 218.

In another exemplary embodiment, a recipe ID is used in the context of an online order, for example to place an order for delivery or for in restaurant pick-up. At 220 the user initiates an online order for food from the selected restaurant that offers the custom condiment. The course of placing the online order at 222 the user adds the recipe ID to the online order and requests custom condiment according to the recipe ID. The restaurant receives the order at 224 the received order includes not only food and drink selection, but also one or more recipe ID's for customer condiments. The food service worker at the restaurant begins preparing the items in the received order. At 226 when the custom condiment is to be prepared by the food service worker, a behind-allowed-counter custom condiment dispenser is operated by the food service worker to produce the custom condiment. In an exemplary embodiment, a computer, mobile or otherwise receives the online orders, including the at least one recipe ID. The computer is communicatively connected to the auxiliary input device of the custom condiment dispenser and the recipe ID for the online order is provided to the custom condiment dispenser so that the custom condiment dispenser can be operated to produce one or more portions of the requested custom condiment.

In the present Description, certain terms have been used for brevity, clearness, and understanding. No unnecessary limitation are to be implied therefrom beyond the requirement of the prior art because such terms are used for descriptive purposes only and are intended to be broadly construed. The different dispenser apparatuses, systems, and methods described herein may be used alone or in combination with other apparatuses, systems, and methods. Various equivalents, alternatives, and modifications are possible within the scope of the appended claims.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of dispensing condiment, the method comprising:
    presenting at least one base condiment and a plurality of flavorings on a user interface of a condiment dispenser;
    receiving a selection through the user interface of a base condiment and a selection of at least one flavoring from the plurality of flavorings;
    operating a first pump pneumatically connected to a reservoir of the base condiment to provide the base condiment to a nozzle;
    operating at least a second pump pneumatically connected to at least one reservoir of the selected at least one flavoring to provide the selected at least one flavoring to the nozzle;
    mixing the base condiment and the at least one flavoring inside the nozzle;
    simultaneously dispensing the base condiment and the selected at least one flavoring from the nozzle; and
    dispensing a flow of the base condiment before and after simultaneously dispensing the base condiment and the selected at least one flavoring from the nozzle.

2. The method of claim 1, further comprising: detecting a presence of a receptacle in a position below the nozzle prior to dispensing the base condiment or the at least one flavoring.

3. The method of claim 1, wherein mixing the base condiment and the at least one flavoring inside the nozzle comprises shear mixing between a laminar flow of the base condiment and a laminar flow of the at least one flavoring.

4. The method of claim 1, wherein receiving a selection of at least one of the plurality of condiment options comprises receiving an input of a recipe ID that represents at least one base sauce option and at least one flavoring option.

5. The method of claim 4, further comprising after dispensing the base condiment and the selected at least one flavoring from the nozzle, operating the user interface to present a recipe ID identifying the combination of base condiment and at least one flavoring dispensed.

6. The method of claim 4 wherein the recipe ID is a quick response (QR) code.

7. The method of claim 6, further comprising, scanning the QR code with an auxiliary input device to receive the recipe ID.

8. The method of claim 1, wherein a controller is operatively connected to the user interface, the first pump, and the second pump and further comprising:
receiving the selection of the base condiment and the at least one flavoring at the controller from the user interface; and
providing control signals to the first pump and the second pump to operate the first pump and the second pump to operate the first pump and the second pump.

9. A method of dispensing condiment, the method comprising:
presenting at least one base condiment and a plurality of flavorings on a user interface of a condiment dispenser;
receiving a selection through the user interface of a base condiment and a selection of at least one flavoring from the plurality of flavorings;
initiating the provision of the base condiment to a nozzle with a first pump pneumatically connected to a reservoir of the base condiment;
operating the first pump to provide the base condiment to the nozzle;
then initiating the provision of the selected at least one flavoring to the nozzle with a second pump pneumatically connected to at least one reservoir of the selected at least one flavoring to simultaneously dispense the base condiment and the selected at least one flavoring from the nozzle;
operating the second pump to provide the selected at least one flavoring to the nozzle;
mixing the base condiment and the at least one flavoring inside the nozzle;
simultaneously dispensing the base condiment and the selected at least one flavoring from the nozzle;
stopping the provision of the selected at least one flavoring to the nozzle with the second pump; and
then stopping the provision of the base condiment to the nozzle with the first pump.

10. The method of claim 9, further comprising operating the first pump to increase a dispense rate of the base condiment.

11. The method of claim 10, wherein the dispense rate of the base condiment is increased concurrent with stopping the provision of the selected at least one flavoring to the nozzle with the second pump to maintain a volumetric flow rate out of the nozzle.

12. The method of claim 9, further comprising operating the second pump in reverse to draw the base condiment into a flavoring inlet configured to deliver the selected at least one flavoring into the nozzle.

13. The method of claim 9, further comprising operating the first pump in reverse to withdraw a portion of the base condiment from the nozzle.

14. The method of claim 8 wherein the reservoir of the base condiment is a first reservoir of a first base condiment and further comprising a third pump pneumatically connected to a second reservoir of a second base condiment, the third pump operatively connected to the controller, and further comprising:
receiving a selection of the base condiment from between at the first base condiment and the second base condiment through the user interface;
selecting with the controller between the first pump and the third pump based upon the received selection of the base condiment;
operating the selected pump between the first pump and the third pump in conjunction with operation of the second to dispense the selected base condiment and the at least one flavoring;
wherein if the first base condiment is selected, the first base condiment and the at least one flavoring are dispensed from a first nozzle, and if the second base condiment is selected, the second base condiment and the at least one flavoring are dispensed from a second nozzle.

15. The method of claim 14, further comprising:
operating at least one valve disposed between the at least one reservoir of the selected at least one flavoring and the first nozzle and the second nozzle with the controller to direct the selected at least one flavoring to the first nozzle or the second nozzle based upon the received selection of the base condiment.

16. The method of claim 14, further comprising:
illuminating a first nozzle indicator positioned relative to the first nozzle if the received selection of the base condiment is of the first base condiment; and
illuminating a second nozzle indicator positioned relative to the second nozzle if the received selection of the base condiment is of the second base condiment.

17. The method of claim 1, further comprising:
sensing a presence of an object positioned below the nozzle with a proximity sensor arranged relative to the nozzle; and
operating the first pump and operating the second pump only when the presence of an object positioned below the nozzle is sensed by the proximity sensor.

18. The method of claim 1, further comprising:
receiving an input of a flavor intensity; and
operating the at least the second pump at a predetermined pumping speed commensurate with the flavor intensity received in the input.

19. A method of dispensing condiment, the method comprising:
presenting at least one base condiment and a plurality of flavorings on a user interface of a condiment dispenser;
receiving a selection through the user interface of a base condiment and a selection of at least one flavoring from the plurality of flavorings;
operating a first pump pneumatically connected to a reservoir of the base condiment to provide the base condiment to a nozzle;
providing the base condiment axially into the nozzle;
operating at least a second pump pneumatically connected to at least one reservoir of the selected at least one flavoring to provide the selected at least one flavoring to the nozzle;
providing the at least one flavoring through at least one radially extending flavoring passageway to a mixing chamber axially centered within the nozzle;

mixing the base condiment and the at least one flavoring inside the nozzle within the mixing chamber; and
simultaneously dispensing the base condiment and the selected at least one flavoring from the nozzle.

* * * * *